(12) United States Patent
Kohane

(10) Patent No.: US 10,673,087 B2
(45) Date of Patent: Jun. 2, 2020

(54) BIO-ENERGY POWER SYSTEM

(71) Applicant: Kohane Technologies, LLC, Chanhassen, MN (US)

(72) Inventor: Michael Kohane, Chanhassen, MN (US)

(73) Assignee: Kohane Technologies, LLC, Chanhassen, MN (US)

( * ) Notice: Subject to any disclaimer, the term of this patent is extended or adjusted under 35 U.S.C. 154(b) by 236 days.

(21) Appl. No.: 15/533,224

(22) PCT Filed: Dec. 3, 2015

(86) PCT No.: PCT/US2015/063632
§ 371 (c)(1),
(2) Date: Jun. 5, 2017

(87) PCT Pub. No.: WO2016/090090
PCT Pub. Date: Jun. 9, 2016

(65) Prior Publication Data
US 2017/0365871 A1    Dec. 21, 2017

Related U.S. Application Data

(60) Provisional application No. 62/088,349, filed on Dec. 5, 2014.

(51) Int. Cl.
*H01M 8/16* (2006.01)
*H01M 8/20* (2006.01)
(Continued)

(52) U.S. Cl.
CPC .............. *H01M 8/16* (2013.01); *H01M 8/20* (2013.01); *H02N 11/002* (2013.01);
(Continued)

(58) Field of Classification Search
None
See application file for complete search history.

(56) References Cited

U.S. PATENT DOCUMENTS

| 2005/0287399 A1 | 12/2005 | Ladisch et al. |
| 2010/0064382 A1 | 3/2010 | Rooney et al. |

(Continued)

FOREIGN PATENT DOCUMENTS

| JP | 2013197047 | * 9/2013 |
| WO | 2007129327 A1 | 11/2007 |

OTHER PUBLICATIONS

Kohane et al. "Biological processes, quantum mechanics and electromagnetic fields: the possibility of device-encapsulated human intention in medical therapies" Medical Hypotheses 56(6), 598-607. (Year: 2001).*

(Continued)

*Primary Examiner* — Blaine Lankford
*Assistant Examiner* — Lauren K Van Buren
(74) *Attorney, Agent, or Firm* — Grumbles Law PLLC; Brittany R Nanzig

(57) ABSTRACT

A bio-energy power system comprising a selection process, an extraction process, and a transfer process. More specifically, a bio-energy power system that uses a selection process to create an energy enhanced organism. In some embodiments, the energy is extracted and consumed using an extraction process to create an energy rich homogenate from the energy enhanced organism and a transfer process to transfer the energy from the energy rich homogenate to the grid or to an energy storage device. In other embodiments, the energy enhanced organism is kept alive and the energy is extracted and consumed using a pure quartz water system (Continued)

for extraction and a transfer process to transfer the energy from the pure quartz water system to the grid or to an energy storage device.

10 Claims, 38 Drawing Sheets

(51) Int. Cl.
    *H02N 99/00*     (2006.01)
    *H02N 11/00*     (2006.01)

(52) U.S. Cl.
    CPC ............ *H02N 99/00* (2013.01); *Y02E 60/527* (2013.01); *Y02E 60/528* (2013.01)

(56) References Cited

U.S. PATENT DOCUMENTS

2011/0014527 A1     1/2011   Ohlsen
2012/0131701 A1     5/2012   Shekdar

OTHER PUBLICATIONS

Cox et al. "Tissue subcellular fractionation and protein extraction for use in mass-spectrometry-based proteomics" Nature Protocols vol. 1, No. 4. 1872. (Year: 2006).*

Kohane et al. "Stress, altered energy availability and larval fitness in *Drosophilia melanogaster*" Heredity 60 (1988) 273-281. (Year: 1988).*

Kohane et al. "Energy, development and fitness in *Drosophila melanogaster*" Proc. R. Soc. Land 257, 183-191 (Year: 1994).*

Kohane et al. "Fitness relationship under different temperature regimes in *Drosophilia melanogaster*: the eyeless/shaven-naked genetic system." Genetica 72: 199-210 (Year: 1987).*

Atanassov et al., "Enzymatic Biofuel Cells," The Electrochemical Society Interface, v. 16, n. 2, Summer 2007, pp. 28-31.

"Burn an energy journal," www.burnenergyjournal.com, retrieved from internet http://burnanenergyjournal.com/, Mar. 2012, 2 pp.

"About Fuel Cells," FuelCellToday, www.fuelcelltoday.com, retrieved from internet http://www.fuelcelltoday.com/, Jun. 2001, 2 pp.

Gray, Forget energy subsidies—build a networked grid instead, Pioneer Press, http://www.twincities.com/2012/10/12/c-boyden-gray-forget-energy-subsidies-build-a-networked-grid-instead/, Oct. 12, 2012, 4 pp.

Kohane, M. J., "Fitness relationships under different temperature regimes in *Drosophila melanogaster*: the eyeless/ shaven-naked genetic system," Genetica, v. 72, 1987, pp. 199-210.

Kohane, Michael J., "Stress, altered energy availability and larval fitness in *Drosophila melanogaster*," Heredity, v. 60, 1988, pp. 273-281.

Kohane, Michael J., "Energy, development and fitness in *Drosophila melanogaster*," Proceedings of the Royal Society of London B, v. 257, Aug. 22, 1994, pp. 185-191.

Kohane, Michael J., et al., "Flight-Muscle Adenylate Pool Responses to Flight Demands and Thermal Constraints in Individual Colias Eurytheme (Lepidoptera, Pieridae)," The Journal of Experimental Biology, v. 202, Oct. 1999, pp. 3145-3154.

Kohane, Michael J., "Energy, Fitness, and Information-Augmented Electromagnetic Fields in *Drosophila melanogaster*," Journal of Scientific Exploration, v. 14, n. 2, Jun. 2000, pp. 217-231.

McKechnie, S., et al., "A search for interacting polymorphic enzyme loci in *Drosophila melanogaster*." Genetic Studies of *Drosophila* Populations, Australian National University Press, Gibson, J. G., and Oakeshott, J. G. (eds.), 1981, pp. 121-138.

McKechnie, S., et al., "A search for interacting polymorphic enzyme loci in Drosophila melanogaster." Genetic Studies of *Drosophila* Populations, Australian National University Press, Gibson, J. G., and Oakeshott, J. G. (eds.), 981, pp. 121-138.

* cited by examiner

FIG. 21

```
┌─────────────────────────────────────────────────────────────┐
│ ETC Energy System: Procedures that yield an ERH with maximal│
│ [ATP]/[ADP] ratio: Culture conditions and and homogenate    │
│ preparation.                                                │
└─────────────────────────────────────────────────────────────┘
                              │
                              ▼
┌─────────────────────────────────────────────────────────────┐
│ F and S strains. 3-5 day old adults transferred to bottles  │
│ with stressful food (O), supplemented with NAD (N) and      │
│ supplemented with NAD plus glucose (NG).                    │
│ 5 day oviposition period, after which adults are removed.   │
└─────────────────────────────────────────────────────────────┘
                              │
                              ▼
              ┌──────────────────────────┐
              │ Assay: 25 third instar   │
              │ larvae.                  │
              │ 25 mg. bio-material.     │
              └──────────────────────────┘
                              │
                              ▼
              ┌──────────────────────────┐
              │ 500ul. water initial     │
              │ homogenizing vol.        │
              └──────────────────────────┘
                              │
                              ▼
              ┌──────────────────────────┐
              │ 100ul. portions          │
              │ supplemented with        │
              │ 100ul. 0.01M NAD.        │
              └──────────────────────────┘
                              │
                              ▼
              ┌──────────────────────────┐
              │ Reaction time of up to   │
              │ 10 minutes.              │
              └──────────────────────────┘
                              │
                              ▼
              ┌──────────────────────────┐
              │ Freeze-clamp in liquid   │
              │ nitrogen.                │
              └──────────────────────────┘
                              │
                              ▼
              ┌──────────────────────────┐
              │ Extract and quantify.    │
              │                          │
              │ [ATP]/[ADP] ratios;      │
              │                          │
              │ O  - F: 1.20; S: 1.12    │
              │ N  - F: 1.71; S: 1.59.   │
              │ NG - F: 3.10; S: 2.12    │
              └──────────────────────────┘
```

FIG. 22

ETC Energy System: Procedures that yield an ERH with maximal [ATP]/[ADP] ratio: Culture conditions and and homogenate preparation.

↓

F strain. 3-5 day old adults transferred to bottles with standard food. 5 day oviposition period, after which adults are removed.

↓

Assay:12-20 third instar larvae.
24-40 mg. bio-material.

↓

500ul. water initial homogenizing vol.

↓

100ul. portions supplemented with 100ul. 0.01M NAD.

↓

Reaction time of up to 10 minutes.

↓

Freeze-clamp in liquid nitrogen.

↓

Extract and quantify. [ATP]/[ADP] ratio = 4.23

For comparison, immediate cessation of metabolic activity (immediate freeze clamping).
Extract and quantify. [ATP]/[ADP] ratio =1.09

FIG. 23

ETC Energy System: Procedures that yield an ERH with maximal [ATP]/[ADP] ratio: Culture conditions and and homogenate preparation.

F and S strains. 20 larvae (0-4 hours old, derived from standard food cultures) transferred to vials containing standard food.

Assay: 8 third instar larvae.
16 mg. bio-material.

500ul. water initial homogenizing vol.

100ul. portions supplemented with 100ul. 0.01M NAD.

Reaction time of up to 10 minutes.

Freeze-clamp in liquid nitrogen.

Extract and quantify.

[ATP]/[ADP] ratios;
F: 4.10; S: 2.99

A. Energy rich fruit fly homogenate supplemented with NAD or no NAD.
B. Energy rich fruit fly homogenate supplemented with NAD or no NAD. NAD, ATP, ADP and AMP extracted.

FIG. 37
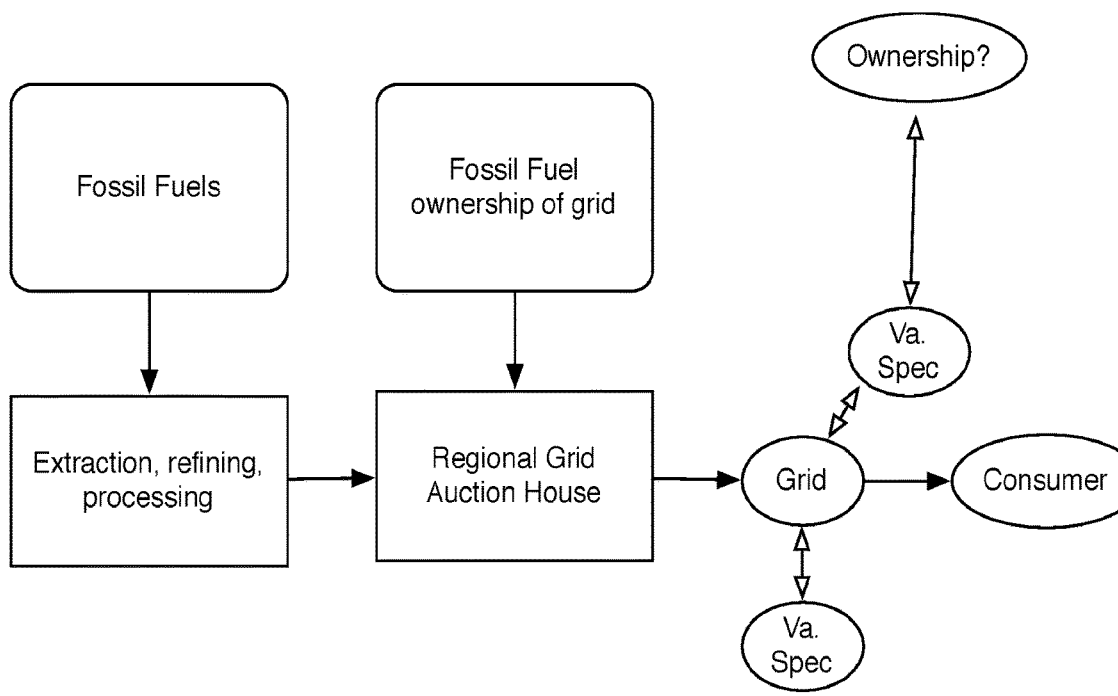
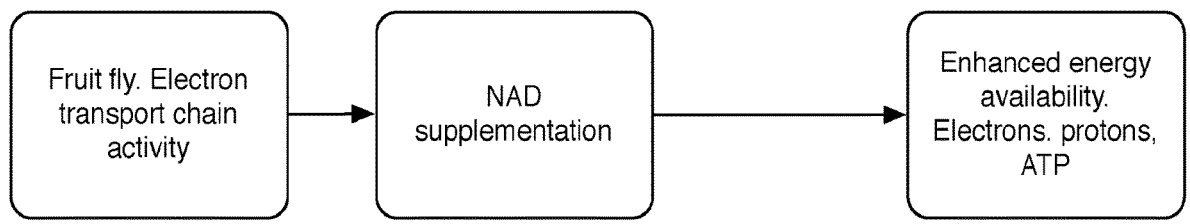
Va: Value added
Spec: Speculation

BIO-ENERGY POWER SYSTEM

CROSS-REFERENCE TO RELATED APPLICATION

This application claims the benefit of U.S. Provisional Patent Application No. 62/088,349, filed on Dec. 5, 2014, titled BIO-ENERGY POWER SYSTEM.

FIELD OF THE DISCLOSURE

The disclosed invention generally relates to bio-energetics. More specifically, the disclosed process and method involves enhancing primary bio-energy systems, such as fruit fly colonies, and harvesting a high yield of electrons, protons, and ATP from the enhanced bio-energy system. The harvested energy can then immediately be made available or it can be stored for future human use.

BACKGROUND OF THE INVENTION

At this time, the best sources of energy and stored energy are fossil fuels, coal, gas, oil and nuclear. These contain high levels of energy that can be released for human use. However, these energy sources come with significant environmental and economic risks. Therefore, alternative energy is an important field of work, and many forms of alternative energy are in use today. Examples of technologies in relatively widespread use are onshore wind, offshore wind, conventional turbine, combined cycle turbine, geothermal, solar PV, hydroelectric, solar thermal, CSP, biomass, biofuel, nuclear, and coal. However, these forms of energy also have major drawbacks. For example, wind turbines can collect renewable energy, but birds and bats are known to collide with the turbines. Another example is corn used to make ethanol for fuel. While this is a renewable energy source, much of the plant is wasted in the process, and thousands of acres of fertile farmland are dedicated to growth of corn for fuel instead of food. Additionally, the energy harvested from renewable sources often cannot be stored; it must immediately be transferred to the grid. And while current scientific advancements, such as storage of solar energy in flow batteries, hydrogen, or molten salt, are making it more likely that renewable sources may be storable, these advances are slow and will not be viable commercial options for years to come.

Another problem associated with many types of renewable energy is access to the power grid. Dispersed energy production, such as with fuel cell, solar, and wind technologies, has limitations with respect to the grid because the energy produced is not maximized at one site or locality and is thus not immediately available to the grid. Instead, energy produced is local and fragmented. These problems do not exist for sources of energy such as oil, coal, gas, nuclear, and hydroelectric because the energy is produced at one locality, a power plant. However, one major drawback is that these energy sources may not be renewable and pose great environmental challenges. Therefore, a source of safe, renewable and environmentally-friendly energy is needed that is energy rich, can be produced at one locality, and can be made available as it is needed.

SUMMARY OF THE INVENTION

The disclosed bio-energy power system can increase bio-energy availability for human use through a technique that does not harm humans or the environment. Additionally, the bio-energy can be generated in one location. The system is based on a renewable biological process (selected, breeding fruit fly strains) that primarily store high levels of energy. This energy can be made available for human use as needed in an efficient way that is analogous to fossil fuels and independent of environmental conditions.

By placing selection pressures on fruit flies, the natural bio-energy (NAD, ATP, ADP, and AMP) and electrical energy (electrons and protons) availability of future generations of fruit flies can be increased. This leads to a decrease in development time and, over time, enhanced survival. The type of selection pressure placed on fruit flies is severe nutritional stress, with NAD as a selective agent, and the electron transport chain (ETC) as the target of selection. Relaxed selection can be used to ensure continuity of generations. The fruit fly strains can be cultured in a vac system (i.e., cultured in a Faraday cage with specific electromagnetic fields), and select crosses can be made between selection strains and parental strains. The strains can be monitored over time and strains that have enhanced energy availability as indicated by decreased development time and enhanced survival can be selected for.

The selected fruit flies with their enhanced energy availability act as the primary energy storage, similar to fossil fuels. The energy in the fruit flies can then be harvested for use via any of the described systems. One system uses fruit flies with enhanced energy availability to create one of four types of energy-rich homogenate that is then integrated with any of the following discrete entities or processes to produce electrical energy: fuel cells, solar panels, linear accelerators, or ETC energy system (HPLC plus coulometric technology). A second system uses fruit flies with enhanced energy availability in a stand-alone, whole organism energy system. This system keeps cultures in a Faraday cage with specific electromagnetic fields, electromagnetic field shielding, a solid-state quartz system acting as a chip, and purified water. Either of these systems can take the produced energy and direct it to a grid or storage device for human use. The biological material, which is the primary energy storage, and the systems needed to carry out the process of bio-energy harvesting can all be located in one central power plant station.

BRIEF DESCRIPTION OF THE DRAWINGS

FIG. 21 is a diagram depicting one embodiment of a process for creating a homogenate from an organism.

FIG. 22 is a diagram depicting one embodiment of a process for creating a homogenate from an organism.

FIG. 23 is a diagram depicting one embodiment of a process for creating a homogenate from an organism.

FIG. 37 is a diagram depicting current issues with the grid and one generalized embodiment of the disclosed system.

DETAILED DESCRIPTION

Figure 1:
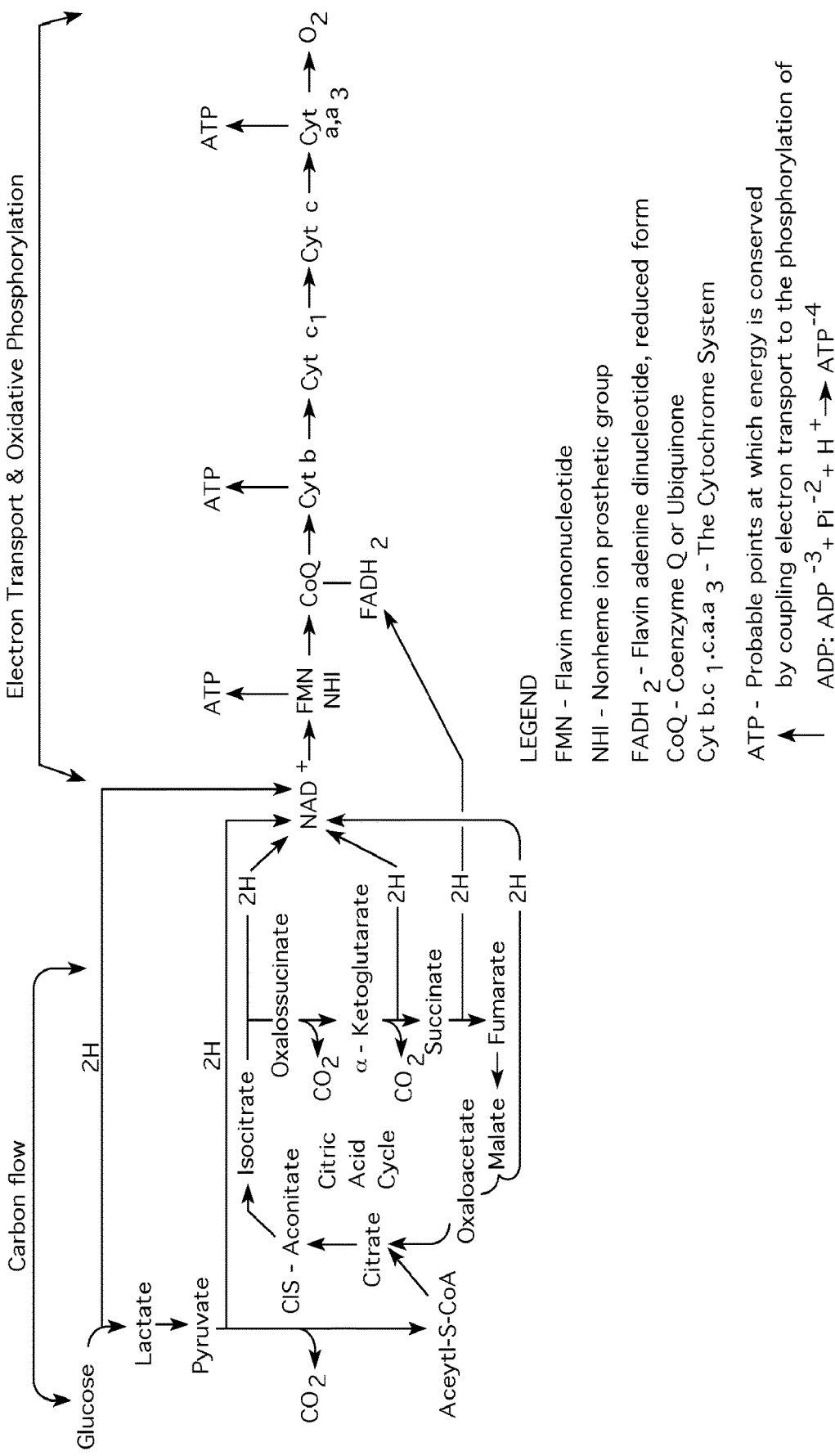
FIG. 1 is a diagram of carbon flow and electron flow in metabolism.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

Overview

At the most basic level, humans require moving electrons and, possibly, moving protons as their primary source of energy for vehicles and other energy-consuming products. Humans typically obtain this energy from carbon-based sources, such as fossil fuels (i.e., oil, coal, gas), because they are energy rich. However, fossil fuels also result in environmental degradation and negative economic impact. Further, as illustrated in FIG. 37, there are several grid issues associated with using fossil fuels as energy. Fortunately, biological material can be used to provide energy through carbon-derived electrons and protons. Therefore, a societal transition from carbon-based fossil fuels to carbon-based bio-energy is both desirable and more acceptable than the transition to non-carbon-based energy. The disclosed invention describes a method and process for harvesting, transferring, and storing energy from biological, carbon-based material to provide energy for human use.

In general, the disclosed system, illustrated in FIGS. 13-16 and 26, transfers electrons and protons from a biological organism to the grid or to a storage device. This transfer may take place through one of two main processes, both illustrated in FIGS. 15 and 16. First, after selection of an energy enhanced fruit fly strain, an energy rich homogenate can be created and coupled directly to fuel cells, solar panels (PVS), a linear accelerator, or to an electron transport chain (ETC) energy system, as illustrated in FIGS. 2-5, 17, and 26, and can move the energy from the biological organism to the grid or to storage. The second process involves the use of a stand-alone, whole organism energy system, illustrated in FIGS. 6-12, wherein the fruit fly strain is kept alive in a standard Faraday cage along with a pure quartz-water system that collects the energy produced.

Figure 18:
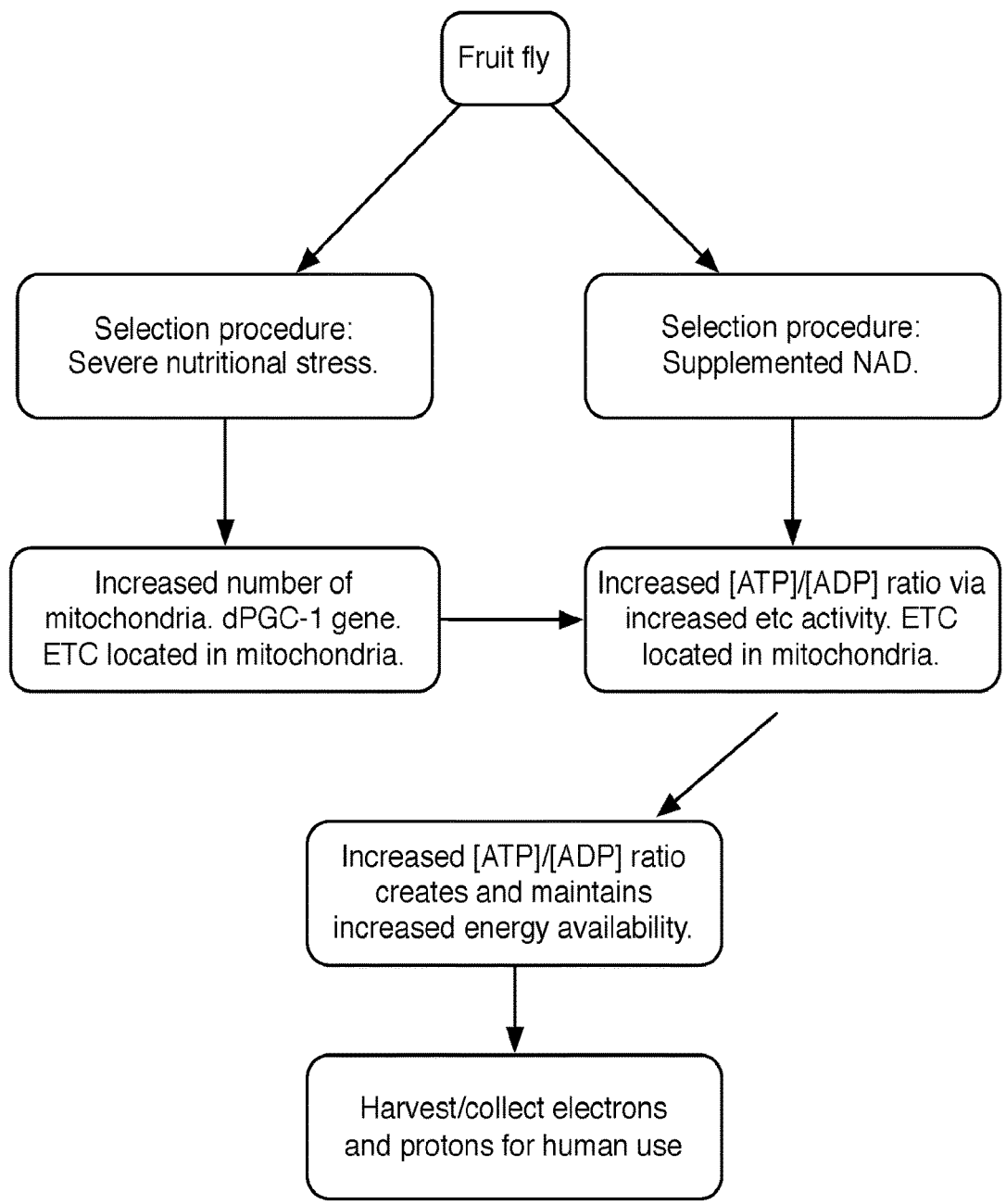
FIG. 18 is a diagram depicting one embodiment of a selection process for the disclosed system.

The first process involves a selection process, briefly illustrated in FIG. 18, extraction process, illustrated in FIGS. 19-23, and transfer process providing immediate energy available for human use or direct access to the grid and storage devices. The selection process, generally, involves placing selection pressures on biological organisms to enhance their energy availability. These selected biological organisms will be the primary storage of energy. The extraction process, generally, involves extracting energy, in the form of electrons, protons and ATP, from the biological organisms. The transfer process, generally, involves transferring the energy from the biological organisms and either (1) providing immediate energy available for human use or (2) transferring the energy to the grid or a storage device.

Selection Process

Figure 38:
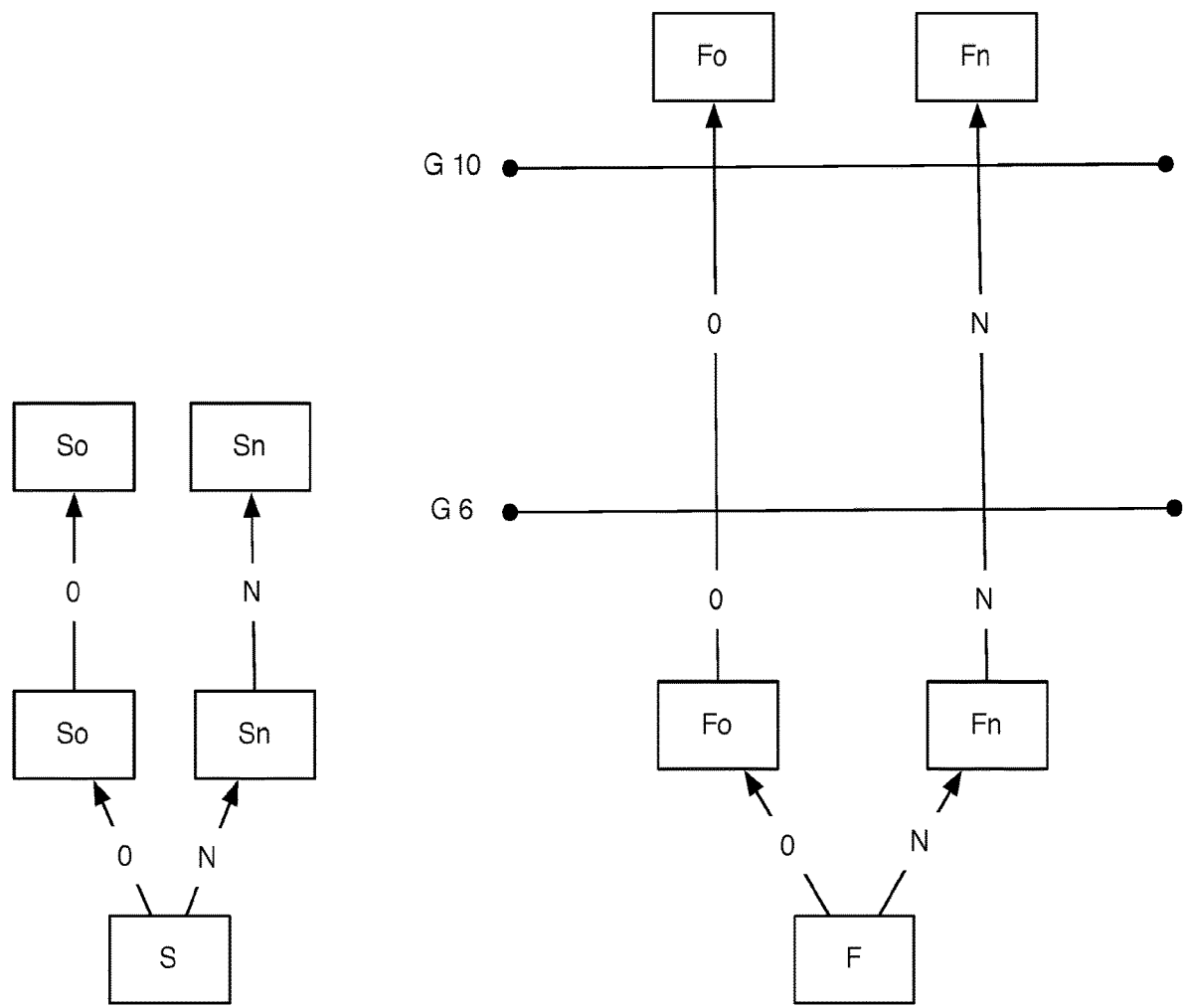
FIG. 38 is a diagram depicting one embodiment of a selection process for the disclosed system.
Figure 39:
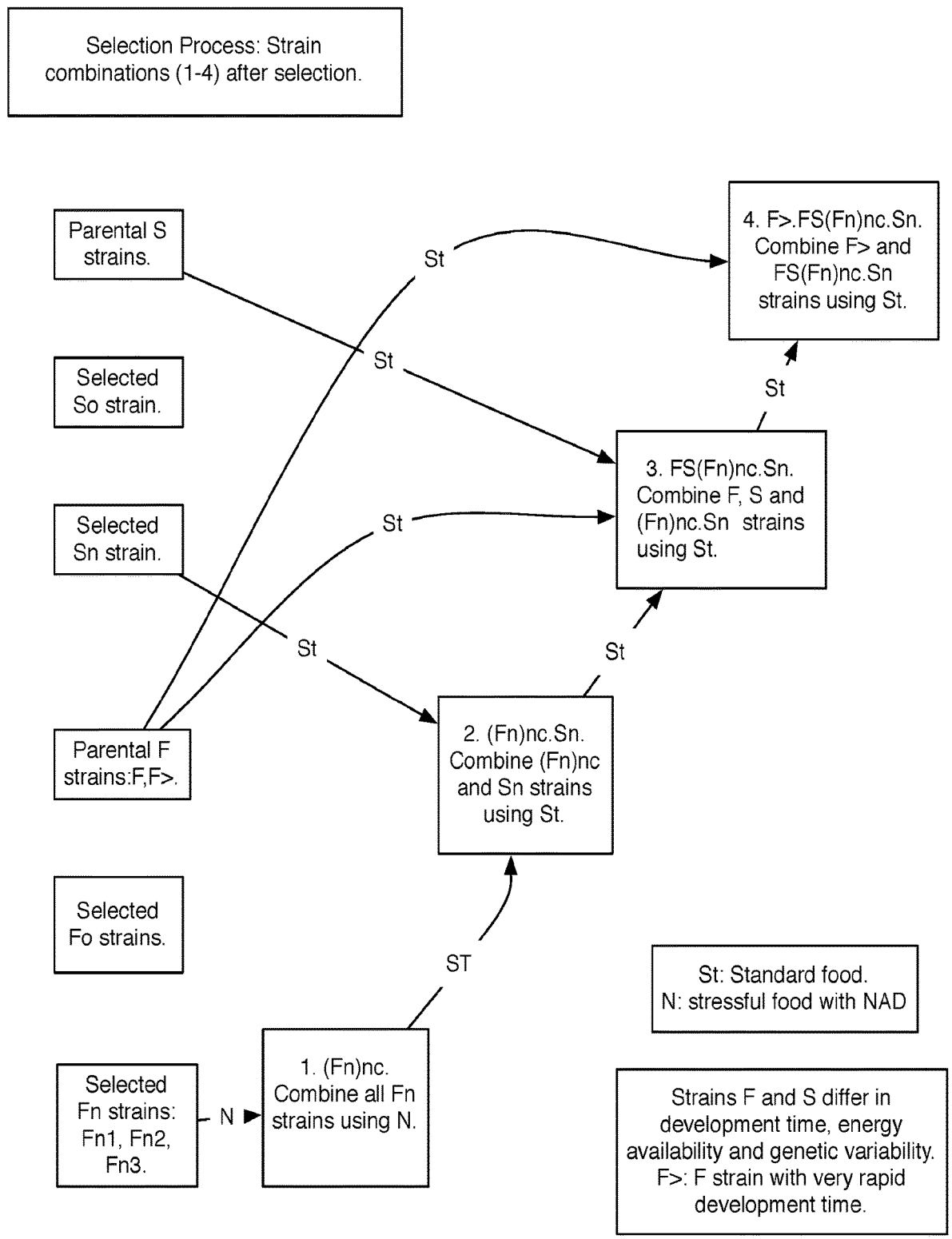
FIG. 39 is a diagram depicting one embodiment of a selection process for the disclosed system.

In some embodiments, the disclosed selection process, illustrated in FIGS. 18, 38 and 39, involves using two strains of an organism, each strain having different development times; severe nutritional stress; continuous multiple generations of selection; use of supplemental NAD and the target of selection (ex: the ETC); relaxed selection to ensure generational continuity; use of the "vac" system, which is a culture in a Faraday cage with specific EMFs; crosses between selected strains and parental strains in various permutations based on decreased development time and increased energy availability; monitoring of selected strains, parental strains, and combined strains over time; and determination of strains with decreased development time and increased energy availability.

Figure 40:
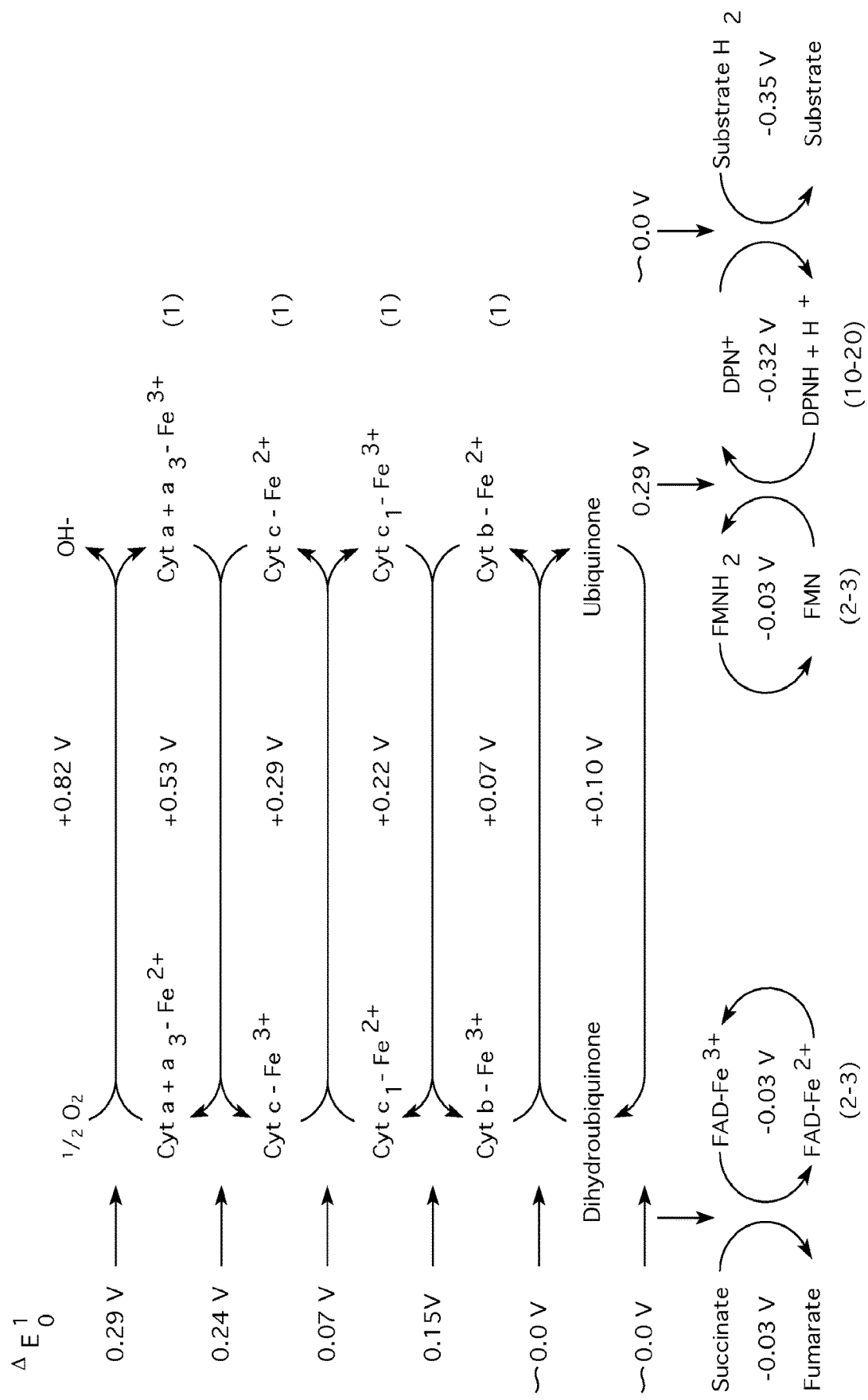
FIG. 40 is a diagram depicting the respiratory electron transport chain.

In a preferred embodiment, a diploid organism is used as the bio-energy source. For example, in one embodiment, *Drosophila melanogaster*, a diploid organism commonly known as the fruit fly, can be grown and cultured. Materials used in the selection process include, but are not limited to, fruit fly strains, culture equipment, food, bottles, vials, a growth cabinet, Faraday cages, and electronic devices. Overall, the procedure involves using two fruit fly strains with differing developmental rates, strain F (fast development time) and strain S (slow development time); applying a bio-energy selection model; focusing on the ETC as the target of selection, the standard energy output of which is illustrated in FIG. 40; using NAD as the selective agent; and shielding offspring from random electromagnetic fields (EMFs) and exposure to specific EMFs. Each portion of the process can increase energy availability in the fruit fly. Additionally, the selection process can result in a fruit fly strain that has increased bio-energy availability, as indicated by a decreased development time, and increased fitness. The selected fruit fly strains can then act as the primary source of energy storage.

Figure 24:
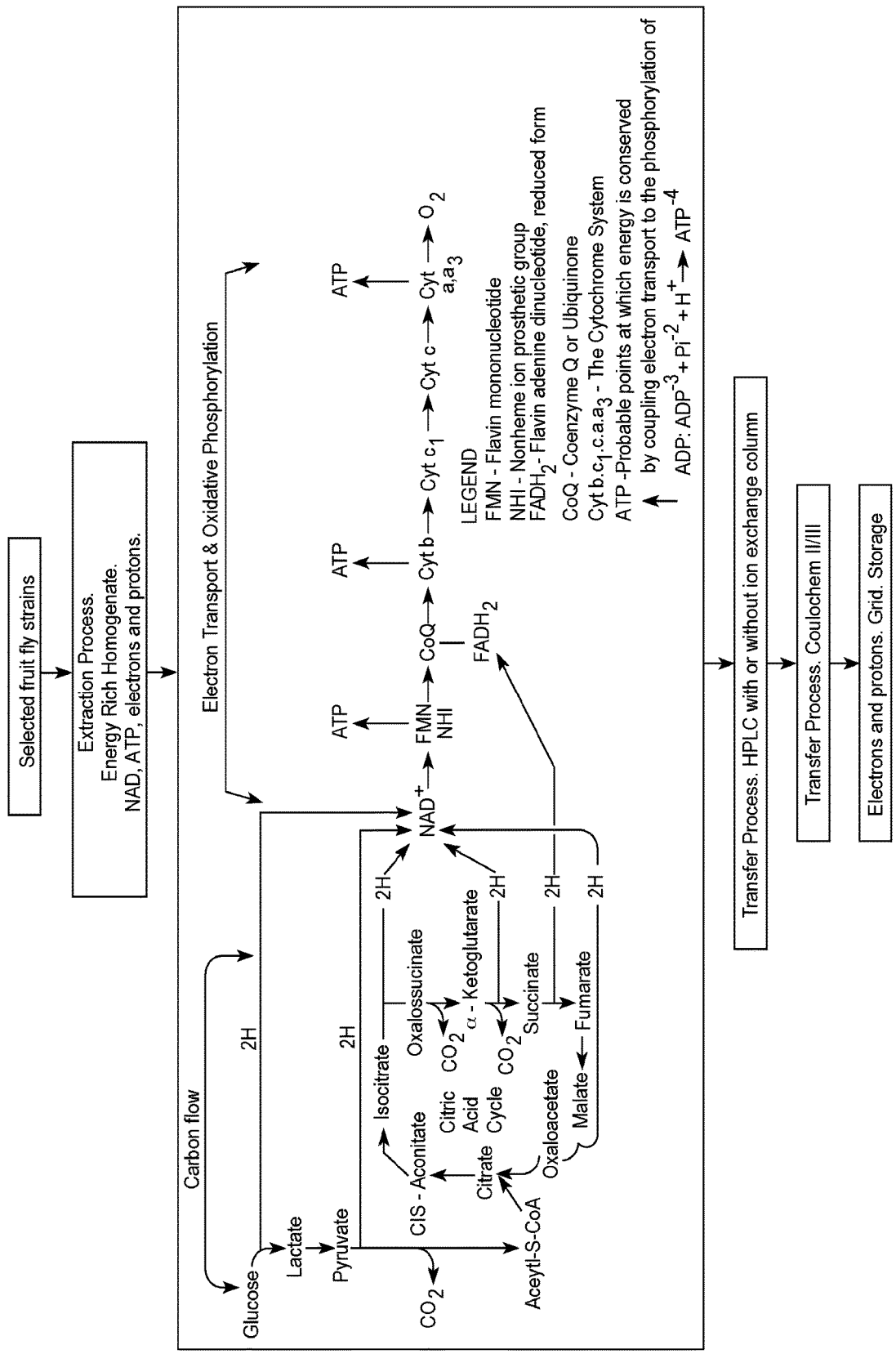
FIG. 24 is a diagram depicting carbon flow and electron flow that occurs in the disclosed system after extraction of energy from an organism.

Because stress exposes natural genetic variation, it can be used as a tool to look for variation in energy metabolism and energy availability via the selective agent NAD. The purpose of the disclosed selection process is to create organisms that have an increase in bio-energy availability by exposing the organisms to stressful food conditions. FIG. 1 illustrates the energy flow in metabolism. FIG. 24 illustrates the metabolic energy flow in the disclosed system. Nutrients, such as carbon or glucose, are consumed by the system and, when metabolized, the co-enzyme nicotinamide adenine dinucleotide (NAD) is available. NAD is a direct participant in the ETC where ATP (i.e., energy) is produced. NAD is also a cofactor for many dehydrogenases, including alcohol dehydrogenase (ADH) and glycerol-3-phosphate dehydrogenase (GPDH) and is, thus, considered a molecule of broad metabolic and physiological function.

During larval development of fruit flies, supplemental NAD can increase the proportion of ATP available and can increase the ATP/ADP ratio, as illustrated in FIG. 18. As mentioned above, FIG. 1 illustrates the central role of NAD in energy metabolism. Specifically, it illustrates the central role in the collection of electrons in energy metabolism and the transfer of electrons to the ETC. In the disclosed system, NAD alters the ETC in larval fruit flies as follows: NAD supplementation modifies the NAD pool, causing it to become relatively oxidized. This effect enhances electron transfer to the ETC from: (1) the NAD pool and (2) electron availability in a fruit fly homogenate as a consequence of conditions that lead to metabolic stasis and absent or limited glycolytic and citric acid cycle activity. The enhanced electron transfer modifies the redox potential causing accelerated electron transport through the ETC and increased proton pumping and energy availability. This effect can increase the proton motor force (PMF) across the inner mitochondrial membrane, subsequently modifying cytosolic phosphorylation status. As noted, decreased development time is associated with an increase in energy availability and an increase in the ATP/ADP ratio.

The disclosed selection process is a novel stress-selection-stabilization model that produces biological material with enhanced bio-energy availability. The selection process utilizes the entire genome of the biological organism and population level processes with no mutagenesis or cloning. The energy can then be transferred from the biological organism to the grid or to storage for human use.

In a preferred embodiment of the selection process, two fruit fly strains, F and S, are used for selection, as illustrated in FIG. 38, to increase genetic diversity and, therefore, enhance energy availability. The two strains can differ in development time, energy availability, and genetic variability. Intense selection for increased energy availability can be carried out for a number of generations (for example, G1 through G5), utilizing, where necessary, relaxed selection to maintain population continuity. Because an increase in energy availability, the ATP/ADP ratio, and ETC activity leads to a decrease in development time, changes in development time can be used as an indicator of increased energy availability.

In a preferred embodiment, the parental strain of adult flies can be cultured on stressful food supplemented with NAD and removed after their eggs have been laid. Stressful food can include water, yeast, and agar. Once the offspring hatch from the eggs in the stressful food supplemented with NAD, those emerging flies ("G1") can then be collected and cultured on standard food and removed from the standard food culture after their eggs have been laid. Standard food can be instant dry food and water. The G1 flies have now been hatched on stressful food supplemented with NAD, have been relocated to a standard food culture, and have laid eggs on standard food. When they are removed from the standard food culture, they are placed back on the stressful food supplemented with NAD to lay eggs in that culture. If none of those G1 adults survive, the emerging flies from the standard food condition, the offspring of G1, can then be used as substitutes for G1 to establish the next generation of selection by being placed on the stressful food supplemented with NAD. However, if any of the G1 adults survive, they will be kept on the stressful food supplemented with NAD until they lay eggs, at which point in time they will then be removed. The emerging flies ("G2") will then complete the same process of the G1 flies, wherein once they hatch, they will be removed to the standard food culture to lay eggs and then transferred back to the stressful food supplemented with NAD to lay eggs, which, if they hatch, become the G3 flies.

In one embodiment, each generation of adults can be given a two-day oviposition period on the stressful food supplemented with NAD. These adults can then be removed and the vials of experimental food can be cultured at 18 degrees Celsius. When all surviving offspring from the experimental food vials have been collected, they can be transferred to a standard food vial for 24 hours. These offspring can then be transferred to the experimental food for a two-day oviposition period to establish the next generation. If there are too few surviving offspring from the experimental food, other progeny of the surviving adults, held on the standard food for 24 hours, can be used to re-establish the offspring generation held on experimental food.

Therefore, the parent generation (G0) can have offspring (G1) that hatch on stressful food supplemented with NAD; G1, once hatched, are then moved to standard food; G1 lays "back-up" eggs on standard food; G1 is moved back to stressful food supplemented with NAD; G1 lays eggs on stressful food supplemented with NAD; G1 is removed from stressful food supplemented with NAD; G1 offspring hatch on the stressful food supplemented with NAD (G2) and are moved to standard food; G2 lays "back-up" eggs on standard food; G2 is moved back to stressful food supplemented with NAD; G2 lays eggs on stressful food supplemented with NAD; G2 is removed from stressful food supplemented with NAD; G2 offspring hatch on the stressful food supplemented with NAD (G3) and are moved to standard food; G3 lays "back-up" eggs on standard food; G3 is moved back to stressful food supplemented with NAD; G3 lays eggs on stressful food supplemented with NAD; G3 is removed from stressful food supplemented with NAD, etc.

Each generation can be conditionally selected based on the ability of the initial surviving flies to establish the next generation. This process ensures continuity of the energy selection process and preserves the changes in energy metabolism and changes in the underlying genetic structure.

Figure 4:
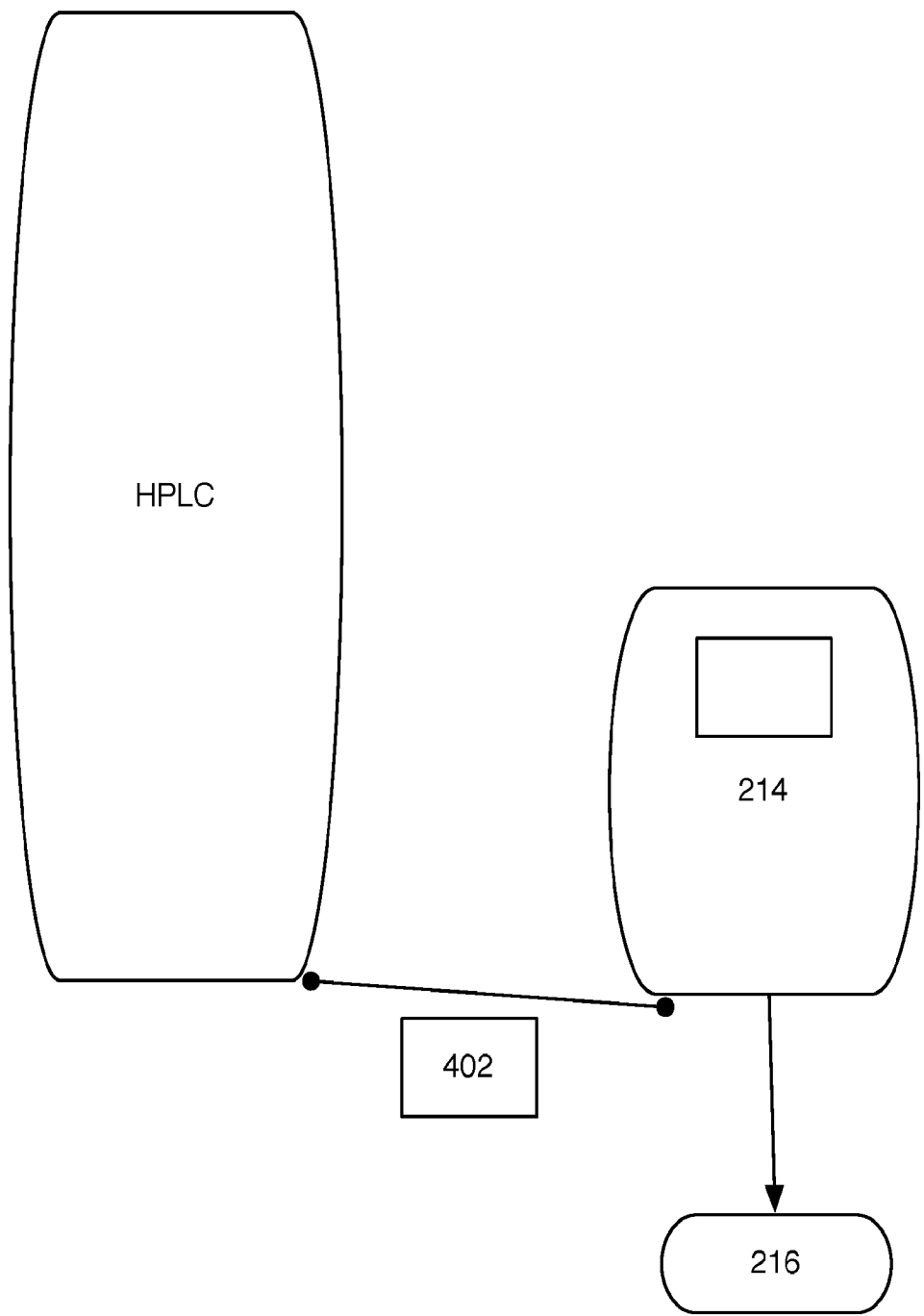
FIG. 4 illustrates one embodiment of a system that aids in making bio-energy available for human use.

In one embodiment, after five or six generations, successful strains will appear in the selection process and can be used for the remaining selection process (for example, G5 through G10, G6 through G10, or G6 through G11). At this point, a vac system can be used and can provide a stabilizing effect on survival. As illustrated in FIG. 4, a vac system is a culture in a Faraday cage with specific electromagnetic fields. A standard Faraday cage includes a copper mesh screen enclosing a certain spatial volume. It is electrically grounded so that the electromagnetic waves of wavelength larger than the mesh size, which impinge the screen, will leak off to the ground and only minimally penetrate the interior space. Thus, the interior space has a greatly reduced electromagnetic integrated power density in the wavelength range larger than the copper mesh spacing. In one embodiment, a layer of copper mesh cages can be expected to reduce the EM field strength by a factor of approximately ten.

After the completion of selection, the parental and selection strains with the greatest bio-energy availability can be maintained on standard food and strain performance can be monitored. Decreased larval development time in the presence of NAD can be attributed to increased bio-energy availability.

Generally, hybridization leads to heterosis, hybrid vigor, the masking of deleterious recessive genes, and an increase in heterozygosity and variability. Segregation over time will destabilize the above and result in an increase in development time.

Over time, random genetic segregation can occur with respect to the above-described selection strains and any non-selection strains. Some strains can exhibit relatively early emergence and a high number of survivors. These strains are considered successful because they provide enhanced bio-energy availability.

After some strains exhibit enhanced bio-energy availability, they can be selected and combined with other successful strains. For example, several successful selection strains can be combined to create a new strain. Alternatively, only two successful selection strains can be combined to create a new strain.

The new strain can then be combined with a selected strain from a different line (example, three strains that started and evolved from strain F can be combined with a strain that started and evolved from strain S). This new strain can then be combined with both parent strains to create a final strain, which is maintained in discrete generations over time. Even though random genetic segregation may occur over time, the final strain can consistently exhibit enhanced energy availability as indicated by decreased development time and large numbers of adult survivors in comparison to all other strains.

For early generations, the selection procedures can enable the establishment of the selection regime and stress levels that can fulfill the need to increase bio-energy availability, determine ETC activity, and increase the availability of electrons and protons. These generations can then be subsequently coupled to other systems. For later generations, the selection procedures can be used to maximize coupling ability with other systems.

In summary, the first step in the disclosed selection process is to use alternating stressful and non-stressful food conditions, measure energy availability, select strains with enhanced energy availability, stabilize and combine these strains over time, allow the selected strains to vary in energy availability over time as a consequence of population level genetic segregation, combine strains with enhanced energy availability at different times, and select and combine strains that have exhibited enhanced energy availability throughout the timeframe.

Once the desired fruit fly strains have been established, the energy they store can be made accessible to humans in various ways. Disclosed herein are five different ways to obtain the energy, four of which involve using the fruit flies to make an energy rich homogenate and one of which involves direct use of the fruit flies in a stand-alone, whole organism energy system 600. The four ways that involve making an energy rich homogenate from the fruit flies all initially proceed using an extraction process, described below and illustrated in FIGS. 19-23. Thereafter, the energy rich homogenate can be used in a fuel cell, a solar panel, a linear accelerator, or an ETC energy system to make the energy available for human use or for transfer to a grid or storage.

Extraction Process

Figure 3:
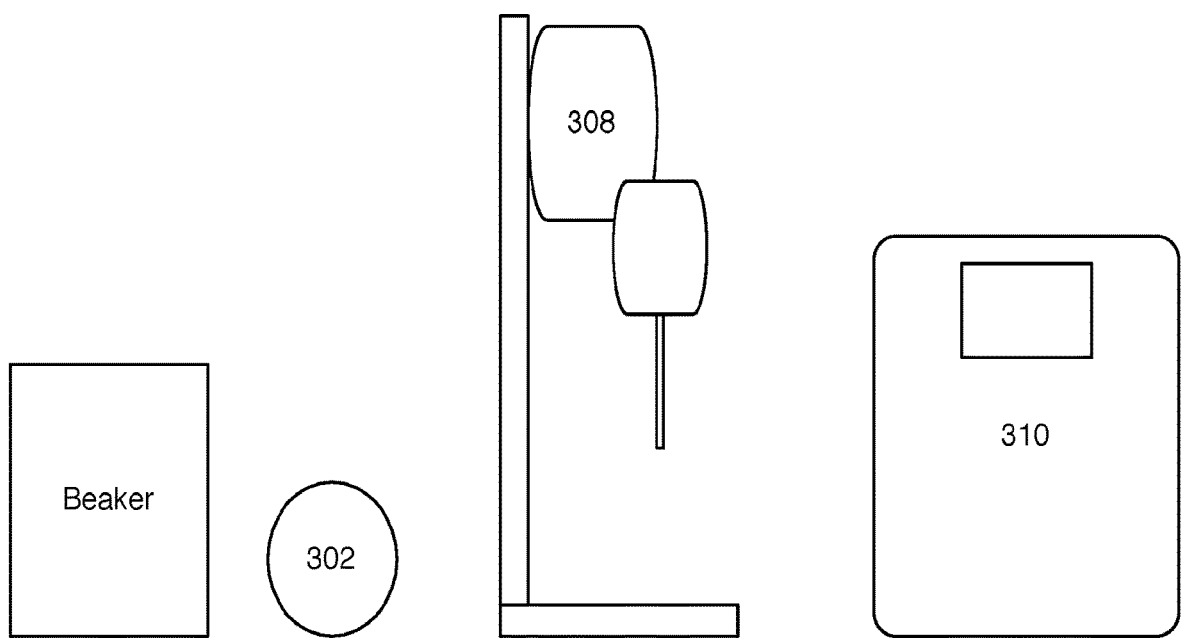
FIG. 3 illustrates one embodiment of the extraction system.

The extraction process, illustrated in FIGS. 19-31, provides energy rich solutions that can be used in a number of ways to provide energy for human use (1) as a component of the fuel cell (2), as a component of the solar panel, (3) in combination with components of the linear accelerator, or (4) by using the ETC energy system, described below. Materials that comprise the extraction system 300 are illustrated in FIG. 3 and can include, but are not limited to, a sample tray 302, microcentrifuges 304, a refrigerated energy rich homogenate holder 306, pH meters and standards, weighing balance, a refrigerated centrifuge 310, homogenizer 308, test tubes, spatulas, glassware, pipettes, liquid nitrogen, storage and distribution equipment, and at least one low temperature bio-extraction apparatus.

Figure 28:
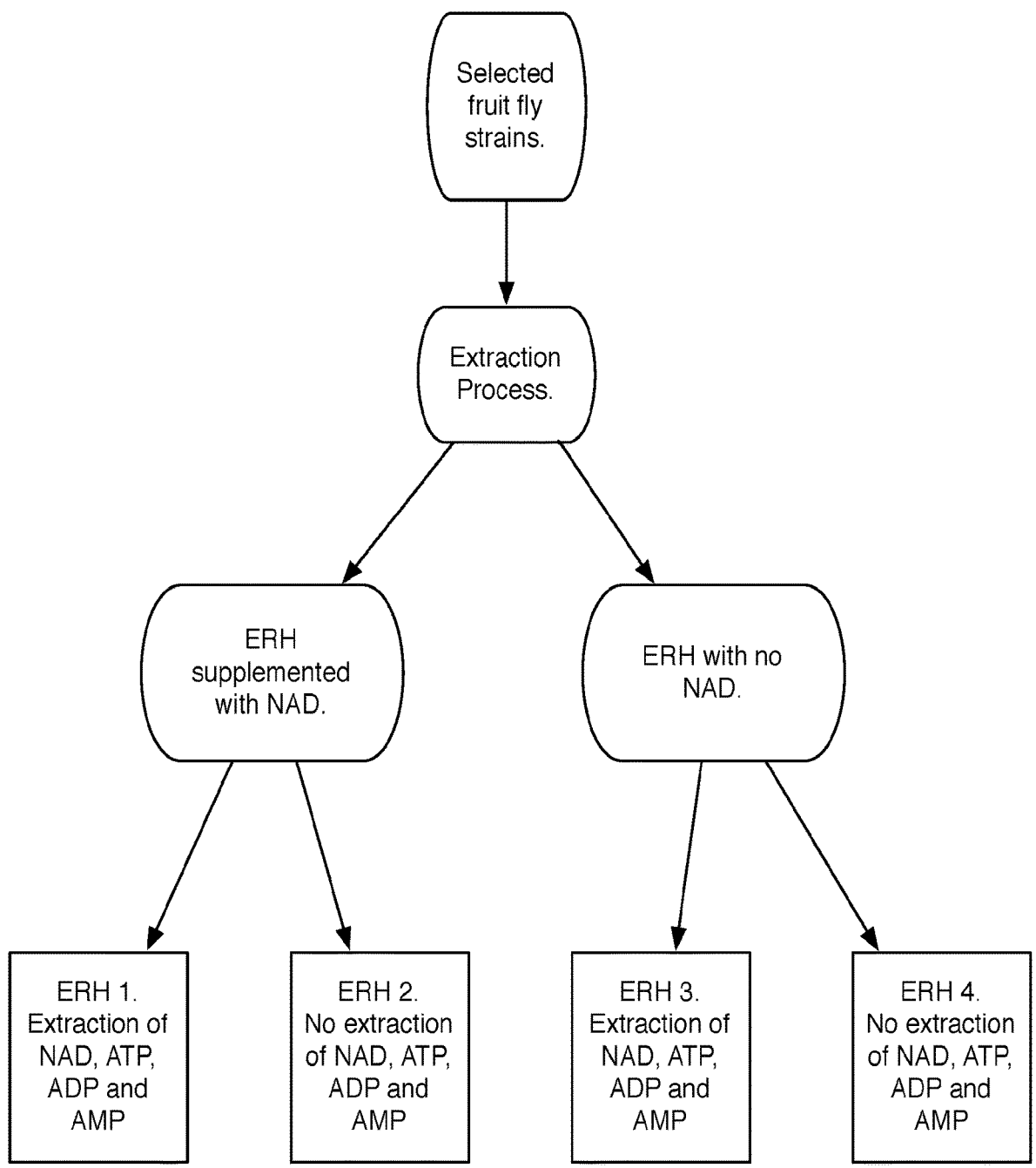
FIG. 28 is a diagram depicting the various energy rich homogenates that are created by using the disclosed system.

In general, the extraction process results in two forms of energy rich homogenates, untreated homogenate and homogenate treated with supplemental NAD, both of which can be further treated in two ways: no extraction of NAD, ATP, ADP, and AMP or extraction of NAD, ATP, ADP, and AMP using formic acid (for example, 4.2 M) and ammonium hydroxide (for example, 4.2 M) and freeze-thaw of homogenate. Therefore, as illustrated in FIG. 28, there are four energy rich homogenates available to enable assessment of the relative energy yield: (1) untreated with no extraction; (2) untreated with extraction; (3) treated with no extraction; and (4) treated with extraction.

Figure 19:
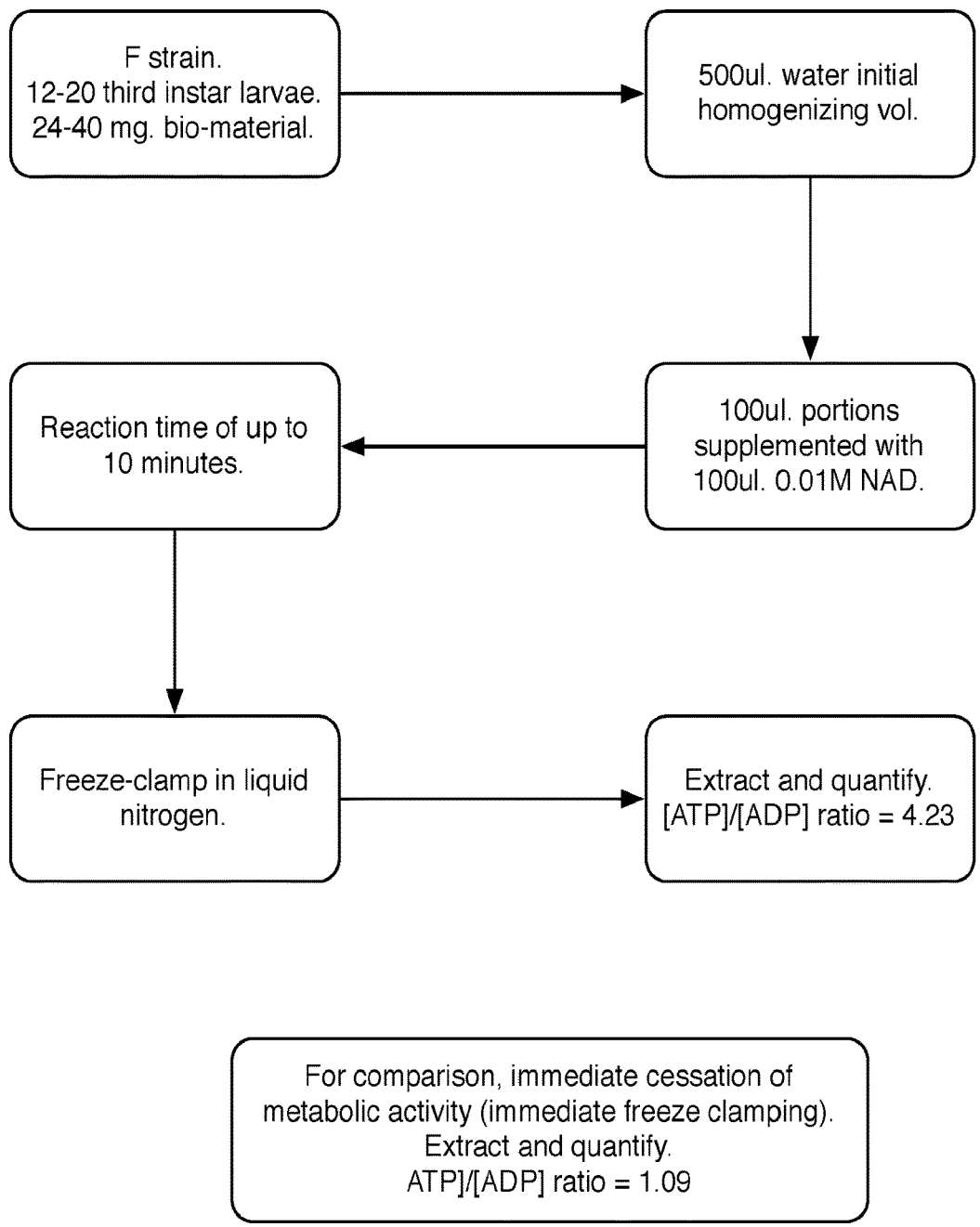
FIG. 19 is a diagram depicting one embodiment of a process for creating a homogenate from an organism.
Figure 20:
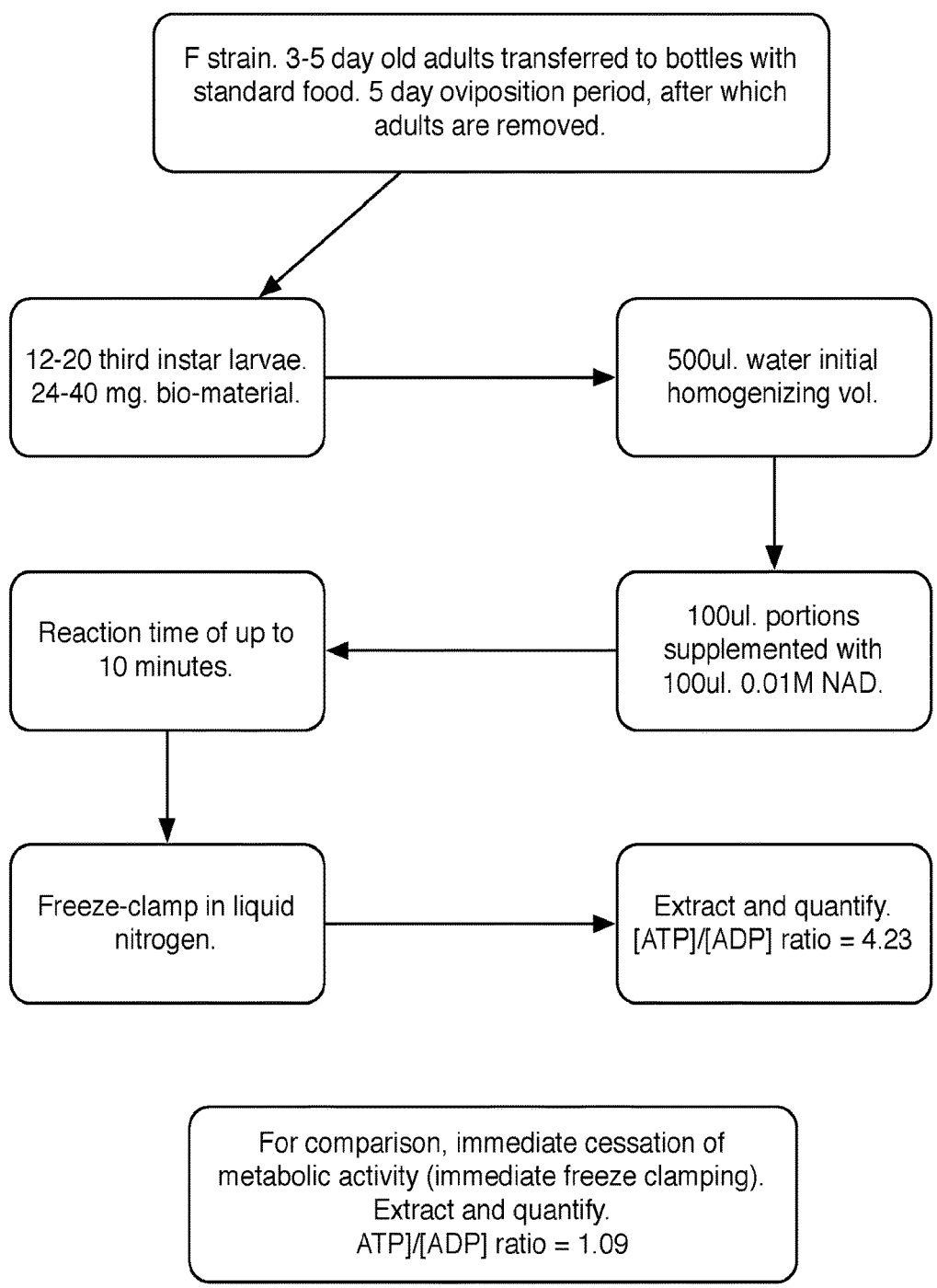
FIG. 20 is a diagram depicting one embodiment of a process for creating a homogenate from an organism.

More specifically, in one embodiment of the homogenate preparation portion of the extraction process, extraction may take place using single larval homogenates prepared from the third instar larvae of single cultures. FIG. 19 illustrates the process for the F strain. FIGS. 20 and 22 illustrate the process for F strain larvae hatched from eggs laid by adults that, at 3-5 days old, were transferred to standard food, given a five-day oviposition period on the standard food to lay the eggs, and then removed. FIG. 21 illustrates the process for F and S strain larvae hatched from eggs laid by adults that, at 3-5 days old, were transferred to stressful food supplemented with NAD and NAD plus glucose, given a five-day oviposition period on the supplemented stressful food to lay the eggs, and then removed. FIG. 23 illustrates the process for F and S strain larvae hatched from eggs laid by adults that laid the eggs on the standard food.

Larvae can be homogenized in pure water (around 500 microL in some embodiments) at 0-3C. Smaller portions of the homogenate, for example 100 microL portions, can be obtained from the initial combination and immediately transferred to centrifuge tubes on ice. In one embodiment, the tubes are initially empty before the homogenate is added to them. In another embodiment, the tubes are initially supplemented with distilled water. In a third embodiment, the tubes are initially supplemented with NAD. The amount of water or NAD in the tubes can vary, but in some embodiments, is 100 microL. The homogenate portion and the supplement, if any, can be mixed and stored on ice for a period of time (for example, 10 minutes) to facilitate metabolic activity.

In a second embodiment of the extraction process, extraction may take place using single larval homogenates prepared from the third instar larvae of single cultures. Larvae can be transferred to microcentrifuge tubes, weighed, and homogenized in various amounts of ice-cold pure water (for example, 250 microL). NAD or pure water can be added to the microcentrifuge tubes in various amounts or concentrations (for example, 250 microL of 0.01 M NAD or pure water). Alternatively, nothing can be added to the microcentrifuge tubes. The solutions can then be mixed and stored on ice for a period of time (for example, 40 minutes) to facilitate metabolic activity.

Figure 29:
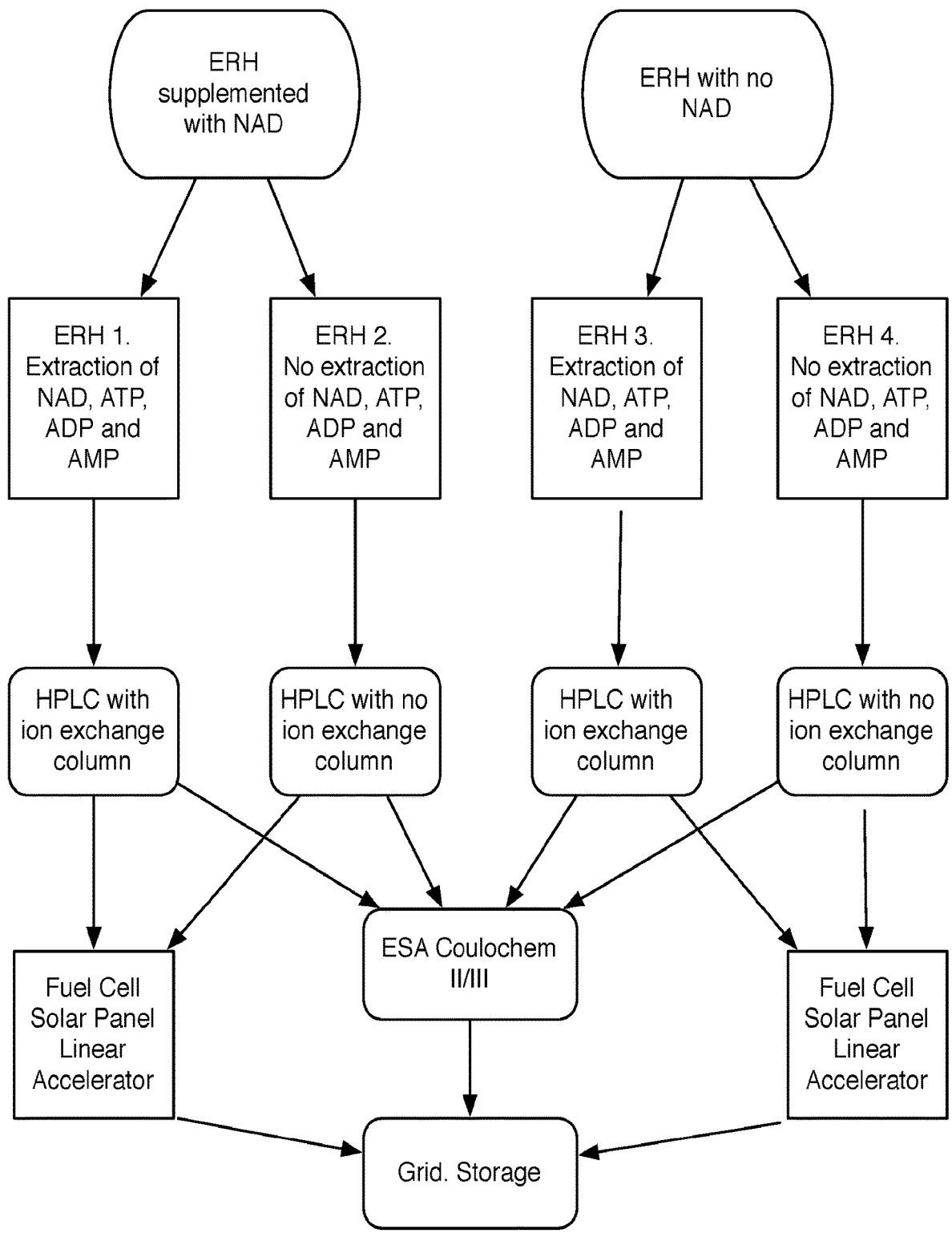
FIG. 29 is a diagram depicting the various energy rich homogenates that are creating by using the disclosed system and how those homogenates can be used as energy for human use.
Figure 30:
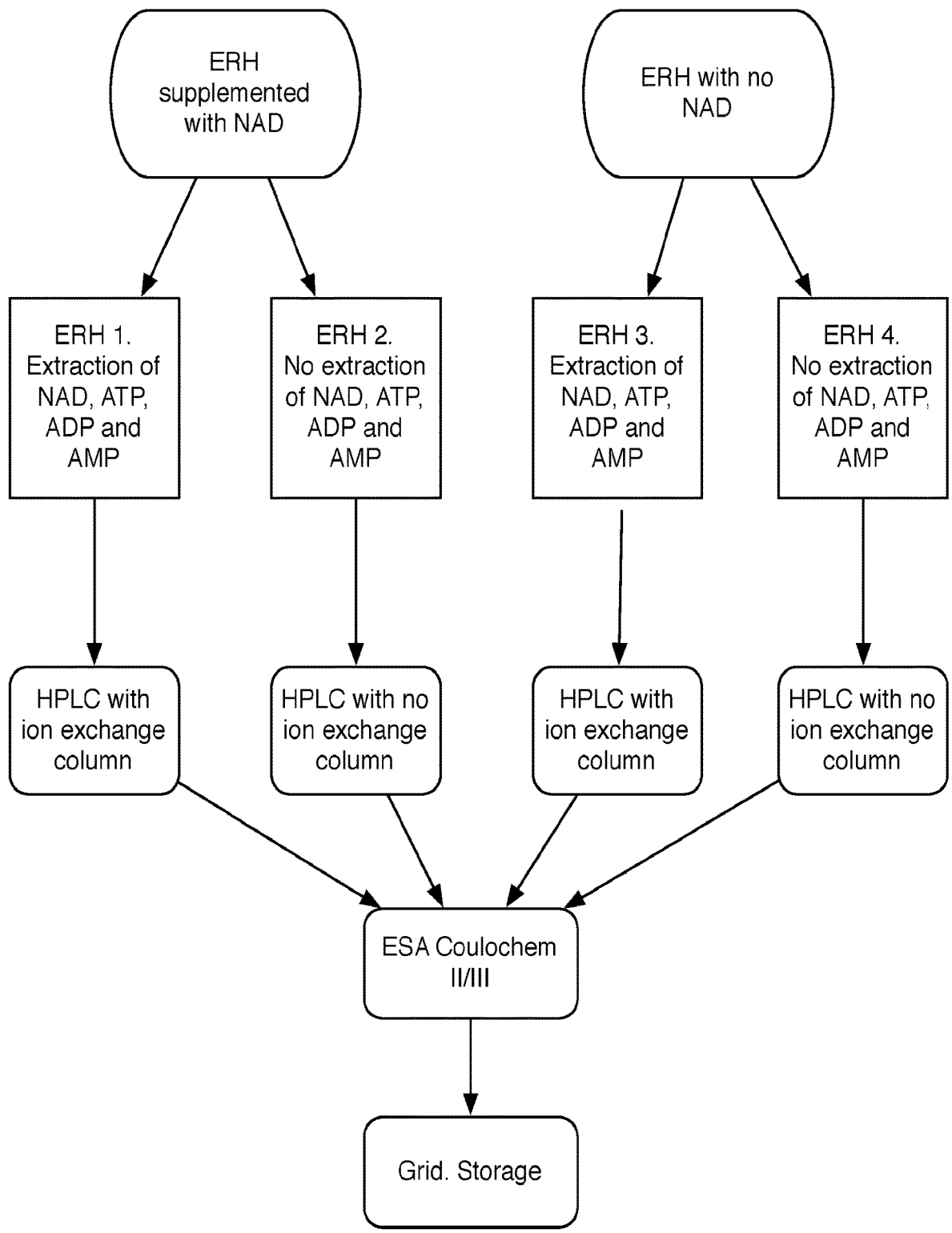
FIG. 30 is a diagram depicting the various energy rich homogenates that are creating by using the disclosed system and how those homogenates can be used as energy for human use.
Figure 31:
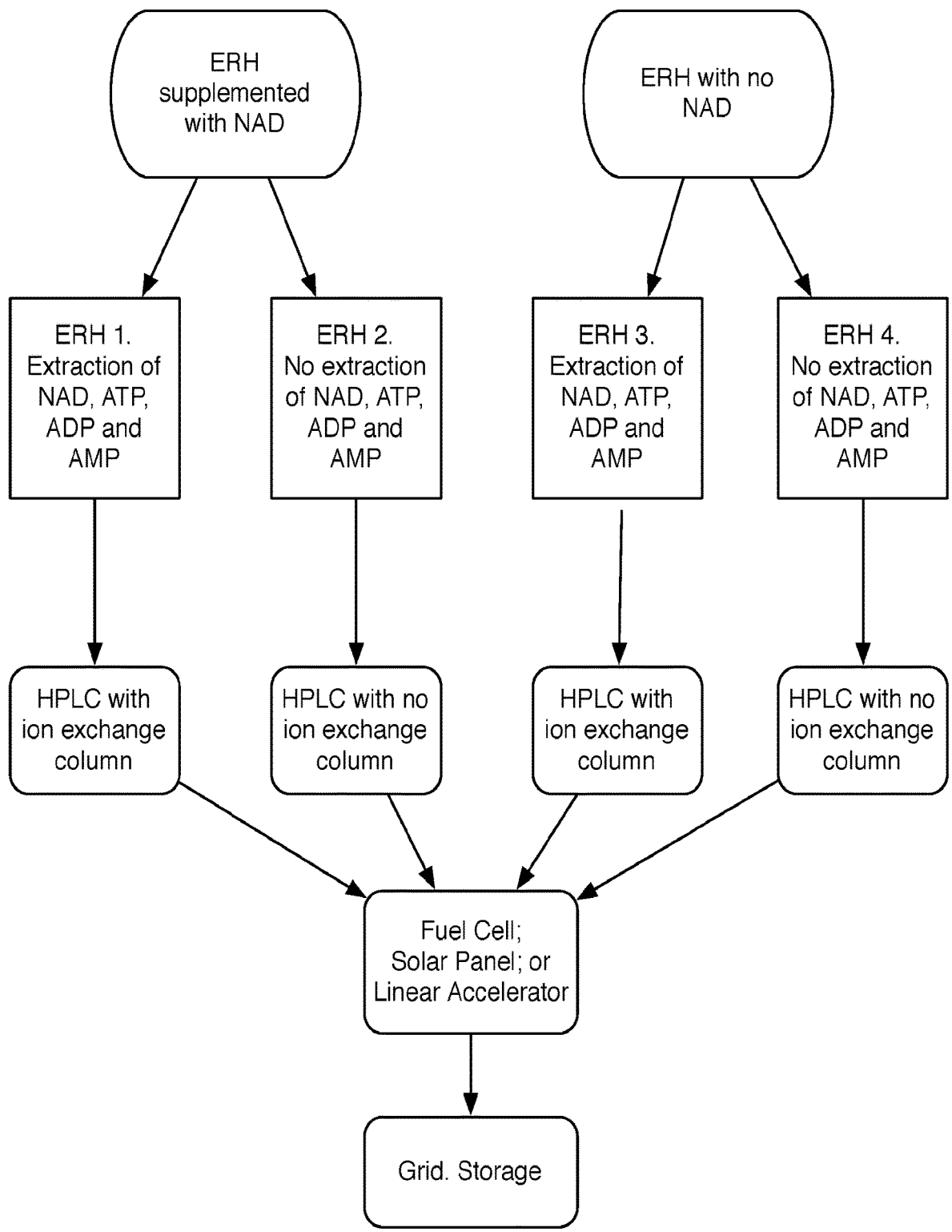
FIG. 31 is a diagram depicting the various energy rich homogenates that are creating by using the disclosed system and how those homogenates can be used as energy for human use.

In some embodiments, the energy rich homogenate from the tubes described above in either embodiment can be immediately transferred to an assay/electron transfer system, as described below and illustrated in FIGS. 29 and 30, or can be used in fuel cells, solar panels, or linear accelerators, as illustrated in FIGS. 29 and 31.

Figure 25:
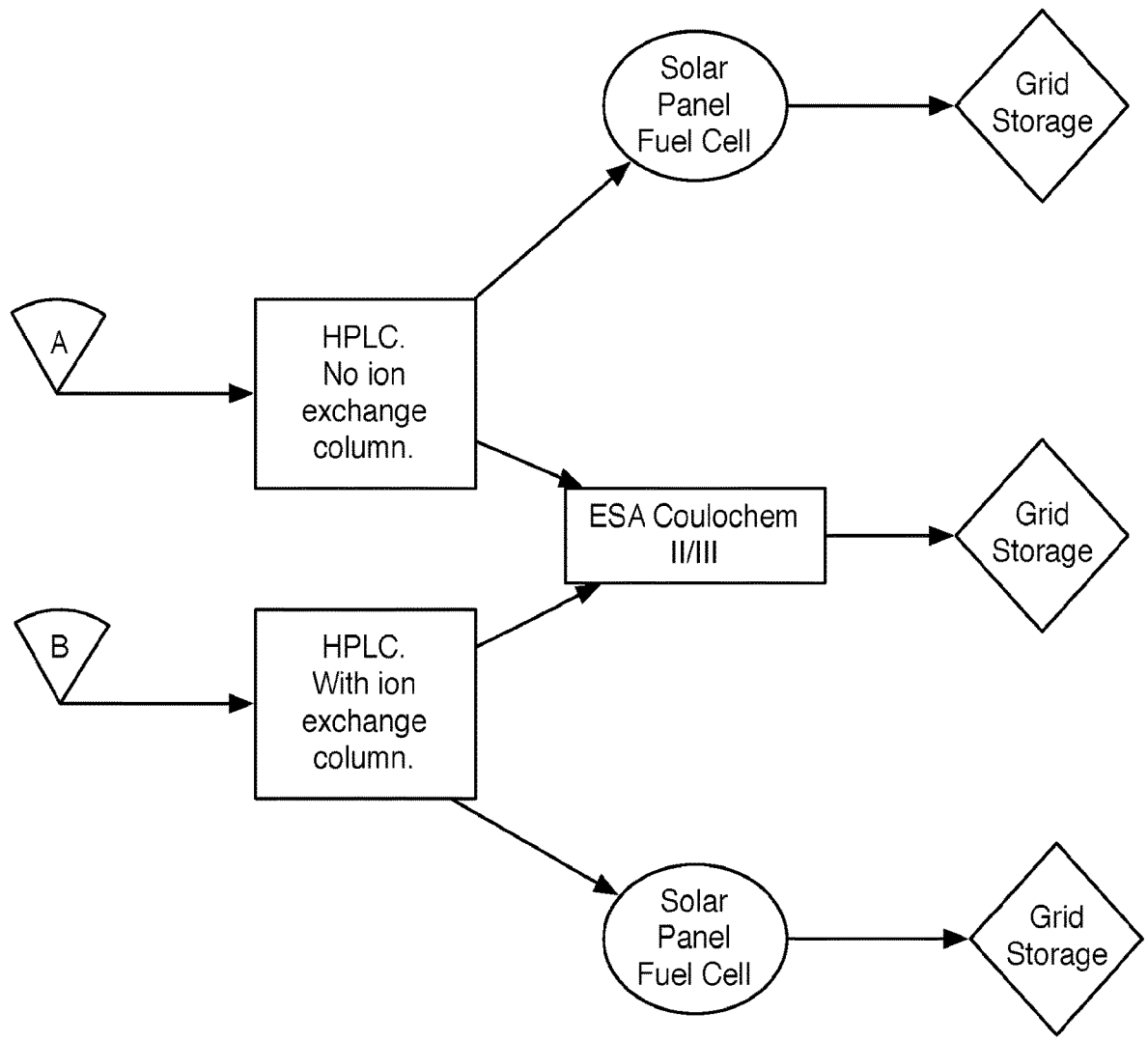
FIG. 25 is a diagram depicting the various ways an energy rich homogenate can be manipulated for human energy use or storage.
Figure 26:
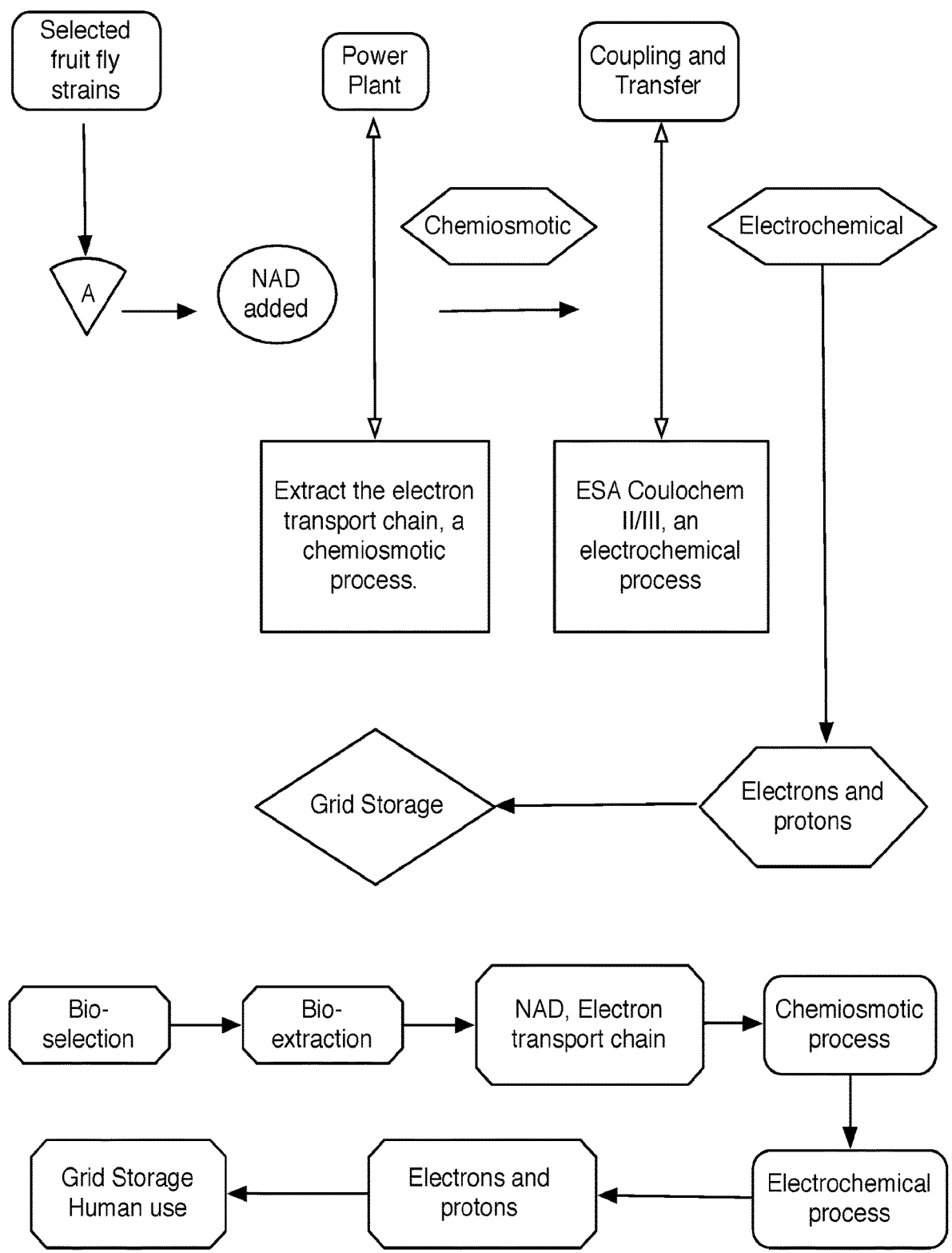
FIG. 26 is a diagram depicting extraction of energy from an organism.

In another embodiment, NAD, ATP, ADP, or AMP can be extracted from the energy rich homogenate in the tubes described above by using formic acid and ammonium hydroxide (for example, 4.2 M formic acid and 4.2 M ammonium hydroxide). In this embodiment, metabolic activity is stopped in the energy rich homogenate. Following that treatment, the remaining energy rich homogenate can then be transferred to an assay/electron transfer system, as illustrated in FIGS. 24, 25, 29 and 30, or can be used in fuel cells, solar panels, or linear accelerators as energy for human use, as illustrated in FIGS. 25, 29, and 31.

ETC Energy System: Transfer Process

Figure 2:
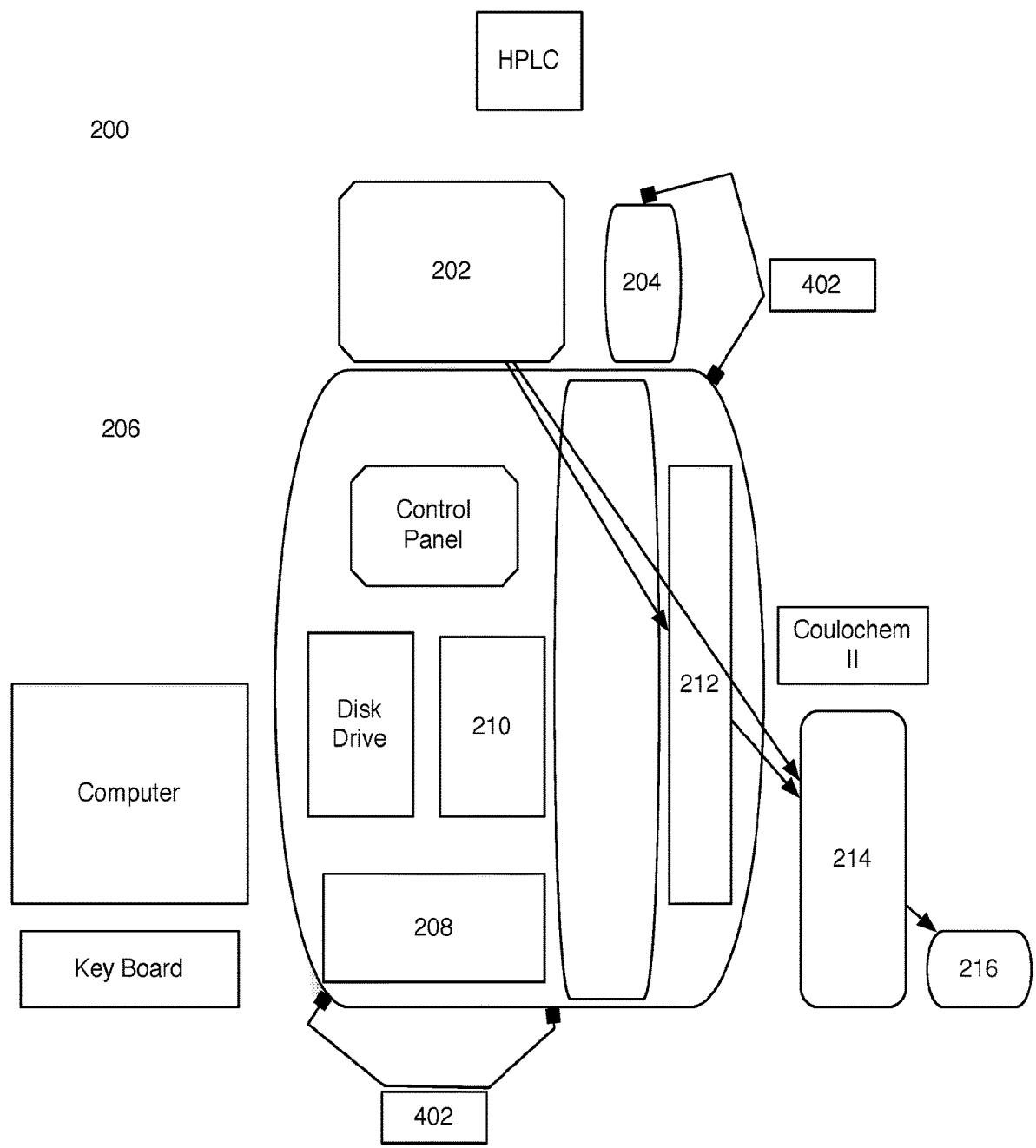
FIG. 2 illustrates one embodiment of a system that aids in making bio-energy available for human use.
Figure 5:
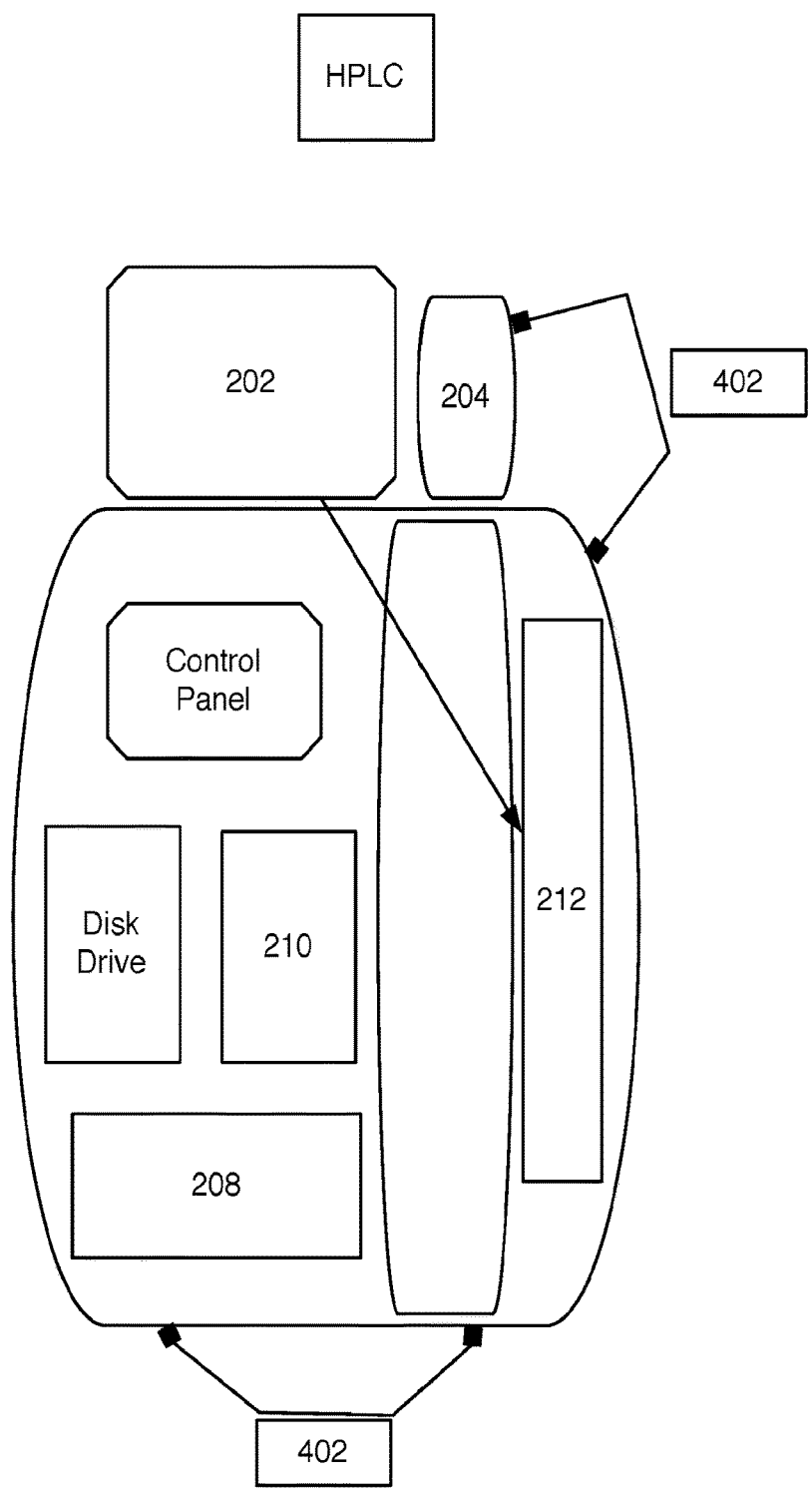
FIG. 5 illustrates one embodiment of a system that aids in making bio-energy available for human use.

In the transfer process, using the transfer system 200 illustrated in FIGS. 2, 4, and 5, the energy rich homogenate can be directly transferred to an electrochemical/coulometric instrument/detector via a high-pressure liquid chromatography (HPLC) pump 208 or via a full HPLC set-up 206 and the output voltage can be assessed. A full HPLC set up 206 includes an HPLC pump 208, separation column 212, mobile phase equipment 204, gradient creator, PDA detector 202, tubing 402, voltmeter 216, and a computing system.

Coulometry determines the amount of matter transformed during an electrolysis reaction by measuring the amount of electricity (in coulombs) consumed or produced. The coulometric device 214 can detect and quantify biomolecules in homogenates or solutions by measuring the amount of electricity consumed or produced during an electrolysis reaction. Therefore, the coulometric device 214 can access and transfer the electrons available in the energy-rich homogenate. Additionally, the coulometric device 214 can output information to a voltmeter 216 to show that energy has been produced.

The HPLC pump 208 or full HPLC set up 206 can be connected to a coulometric device 214, which couples biologically-determined, enhanced ETC activity, a chemiosmotic process, to a complex electrochemical process in order to help transfer the energy (i.e., electrons and protons) from the fruit fly to the grid or to a storage device for human use.

The transfer process, generally, starts with one of the four forms of energy rich homogenate, described above: (1) untreated with no extraction; (2) untreated with extraction; (3) treated with no extraction; and (4) treated with extraction.

The energy rich homogenates, whether treated or untreated and extracted or not extracted, can be directly transferred to a coulometric device 214 in one of two ways. The first way is via an HPLC pump 208. The second way is via a full HPLC set up 206, which includes the HPLC pump 208, location for homogenate samples 210, a separation column 212, mobile phase equipment 204, a gradient creator, and a PDA detector 202. The output voltage can then be assessed and the specific energy molecules collected for subsequent use.

If the full HPLC set up 206 is used for energy rich homogenates that have had NAD, ATP, ADP, and AMP extracted, the HPLC set up 206 can incorporate an ion exchange column with a mobile phase or pre-programmed gradient. One example of a gradient is 0.033 M sodium formate titrated to pH 4.5 with phosphoric acid and 0.5 M sodium phosphate titrated to pH 2.7 with formic acid. A second example of a gradient is 0.05 M sodium phosphate monobasic and 0.5 M sodium phosphate monobasic, titrated to pH 2.8 with formic acid.

In a preferred embodiment, the coulometric device 214 can use a cell where the reactive bio-molecules in the eluent flow though a porous graphite electrode, rather than flowing by an electrode. Therefore, with this design, almost all of the reactive bio-molecules can be oxidized or reduced. Alternatively, in one embodiment, the reactive bio-molecules in the eluent can flow by the electrode. However, the preferred embodiment results in a larger amount of reactive biomolecules (10-20 times as much). The current that is produced is directly related to the concentration of the species of interest.

Figure 17:
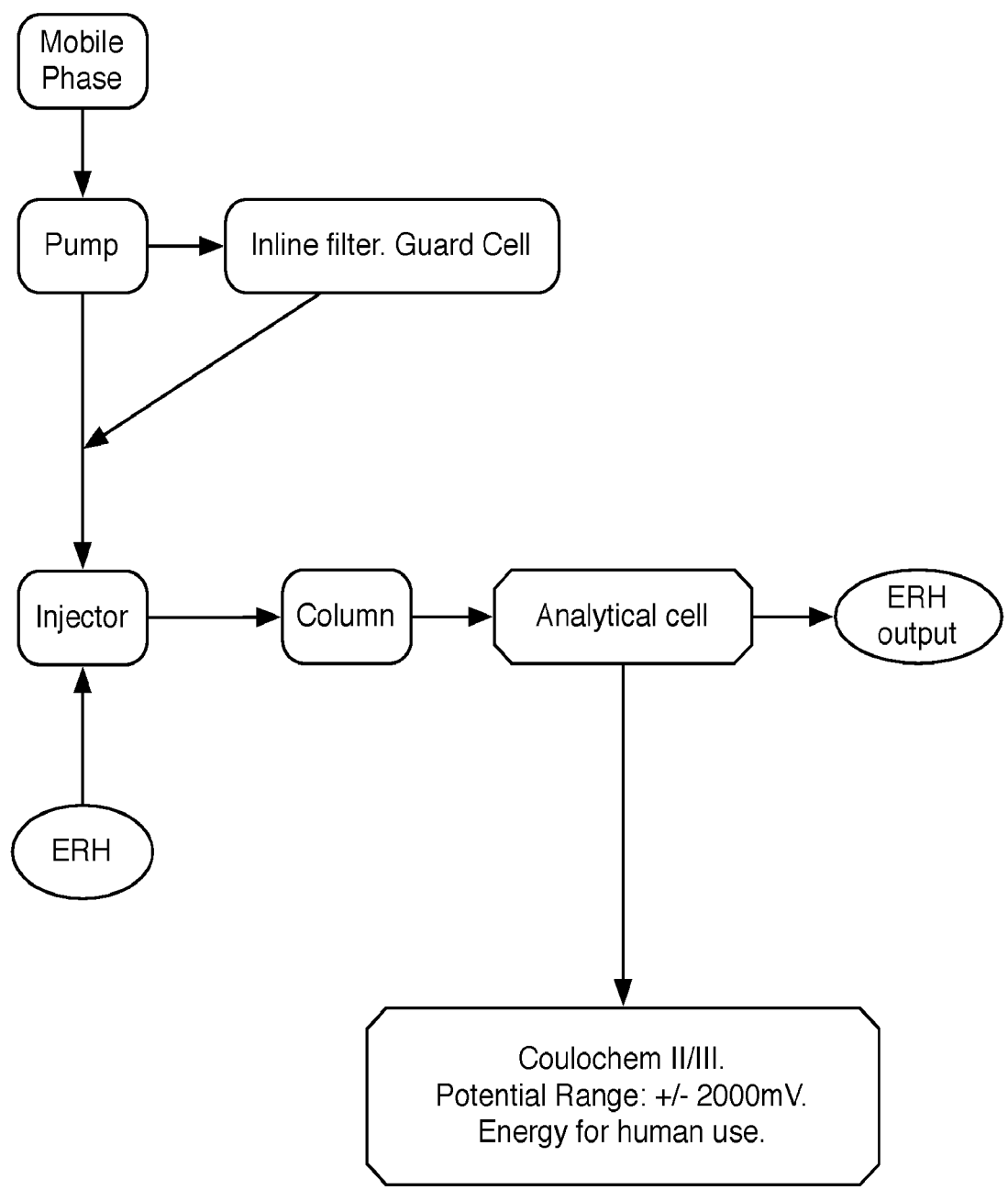
FIG. 17 is a diagram depicting an instrument configuration for the disclosed system.

As illustrated in FIG. 17, after the HPLC pump 208 is connected to the coulometric device 214, the homogenate can be injected manually with an injection valve. In one embodiment, a flow rate of 1 ml/min is used. In a preferred embodiment, the HPLC pump 208 should be thoroughly primed and should deliver a consistent flow rate. The HPLC pump 208 may need backpressure (for example, approximately 1000-psi) to function efficiently. If a separation column 212 is used, the separation column 212 can create this backpressure. Otherwise, a long piece of narrow bore tubing can create a backpressure coil. In another embodiment, a full HPLC set-up 206, which is fully automated for sample injections, could be used to transfer the homogenate to a coulometric device 214.

Figure 27:
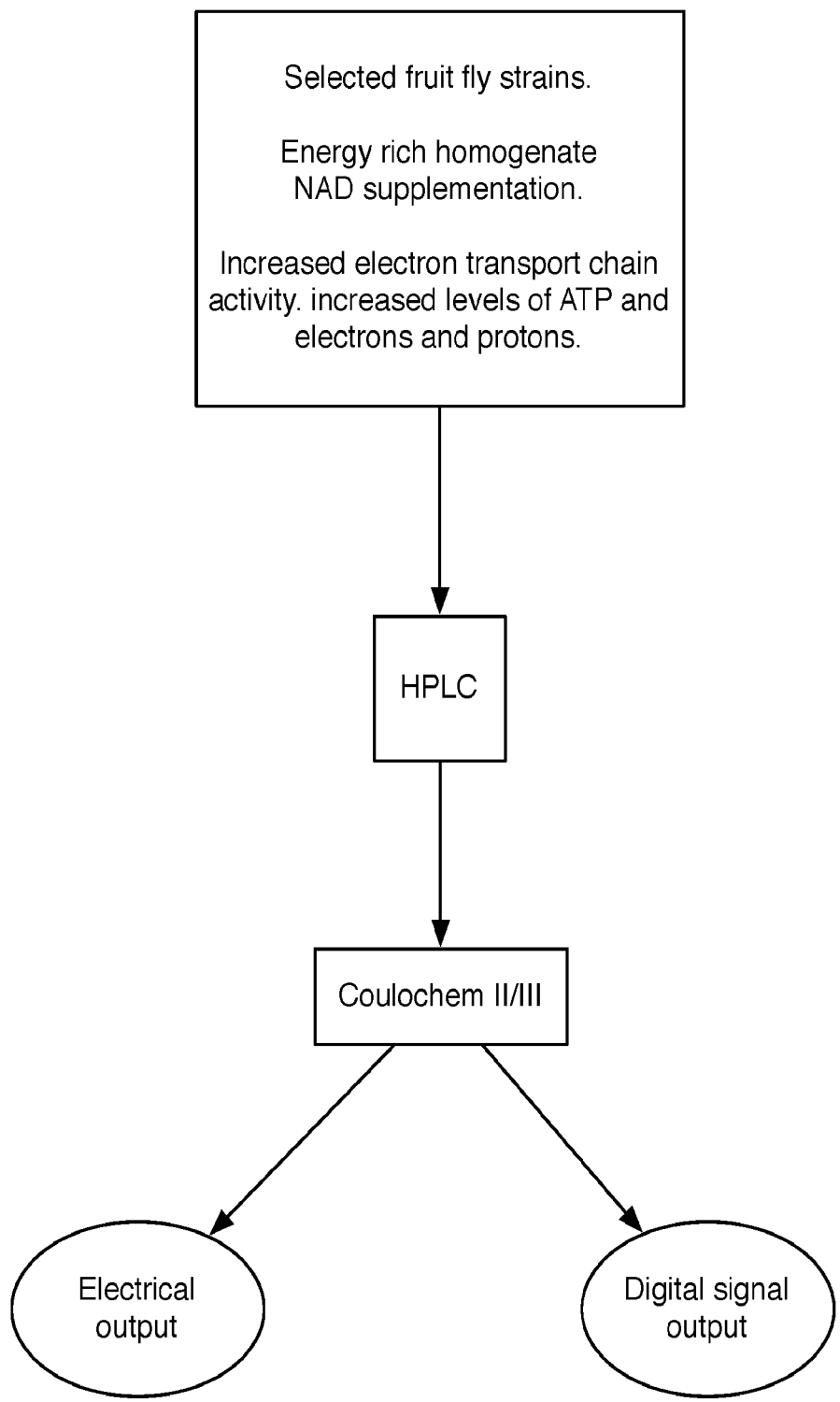
FIG. 27 is a diagram depicting the various outputs when an energy rich homogenate has been processed through a high-pressure liquid chromatography pump.

There are two types of output from the coulometric device 214: electrical output and digital signal output, illustrated in FIG. 27. The most important initial output from the coulometric device 214 is from a Bayonet-Neill-Concelman (BNC) connector, since open wires to the voltmeter 216 can show that energy is produced and, therefore, that the coulometric device 214 works. All other outputs, briefly described below, explain how to send the electrical signal from the coulometric device 214 to an A/D convertor and onto a computer for quantification and analytical purposes only; no electrons or protons would be provided as energy for human use. Depending on the software, the signal can be analyzed in various ways.

To output the data for quantification and analytical purposes, in one embodiment, the BNC connector can be attached to a voltmeter 216 and a coaxial cable, which can be connected to an analog-digital convertor, which can be attached to a personal computer. Software on the computer can be used to record the output information. In another embodiment, RS-232 can be connected to a USB, which can connect to an A/D converter box, which can connect to a personal computer running specific software such as, but not limited to, Thermofisher/Dionex software or Waters software. In another embodiment, Chromeleon software can be used, but would require an interface box to digitize the signal coming from the detector to the computer. In this embodiment, the user can run an Ethernet cable from the coulometric device 214 to an interface box, bypassing the BNC, and then to the computer to utilize the software.

Fuel Cells

Figure 32:
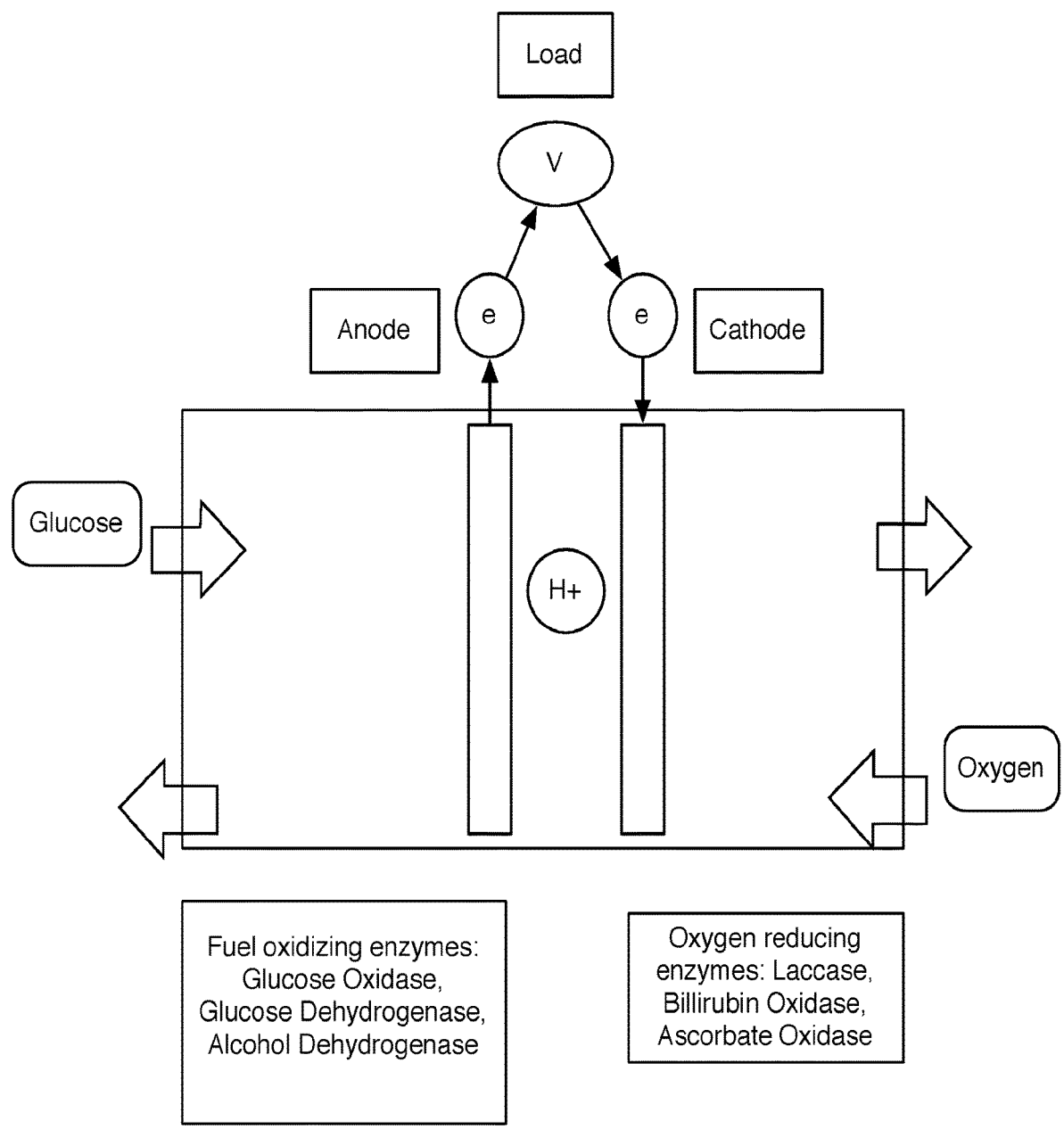
FIG. 32 illustrates an example enzymatic biofuel cell.
Figure 34:
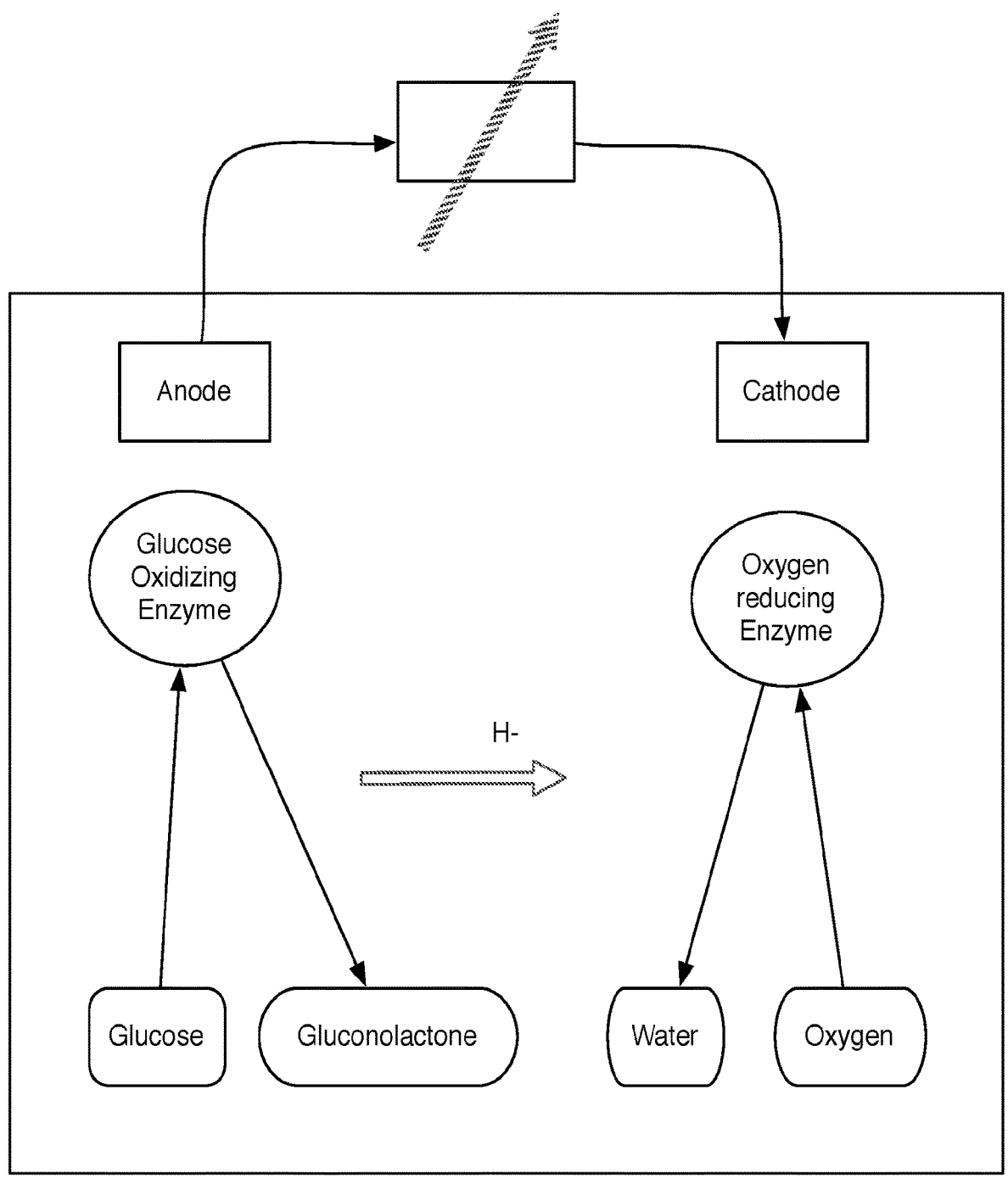
FIG. 34 illustrates an example enzymatic biofuel cell.

The energy rich homogenate can be used directly in a fuel cell as a novel reactive matrix. In a preferred embodiment, a set-up similar to an enzymatic biofuel cell, illustrated in FIGS. 32 and 34, is used that includes an anode and a cathode.

A traditional fuel cell can have a positively charged electrode (i.e., cathode) and a negatively charged electrode (i.e., anode) separated by an electrolyte, such as, but not limited to, ceramics or plastic membranes, or by a proton exchange membrane or polymer electrolyte membrane (PEM). The electrolyte or PEM can prevent the flow of hydrogen and electrons between the cathode and the anode. However, hydrogen ions, which consist of one proton, can still pass through.

A standard fuel cell combines a fuel with an oxidizer to make electricity and heat. In PEM fuel cells, hydrogen, the fuel, passes over the anode, where it is split into electrons and hydrogen ions, which are protons with a platinum catalyst. The electrons pass through an external circuit where their energy is used to run an electrical device, before migrating to the cathode. Once the positively charged ions have passed through the PEM at the fuel cell center, they are combined with oxygen, the oxidizer, at the cathode to produce water using a platinum catalyst. The PEM fuel cell is like a battery in that the two electrodes are separated by an electrolyte. However, in the fuel cell, unlike in a battery, the electrode is not consumed. Therefore, this is a fuel cell that will continue to produce electricity as long as it is continuously fueled with hydrogen and oxygen. Heat and water are the only byproducts of this fuel cell.

One type of fuel cell is an electrochemical cell that directly converts the energy of oxidation of fuel to electrical energy. Electrodes can be immersed in an electrolyte and the fuel (i.e., hydrogen) can be supplied to one electrode while the oxidizer (i.e., oxygen) is supplied to the other electrode. Electrode reactions can occur leading to oxidation of the fuel with the production of an electric current. Fuel cells can produce electricity from the reaction of fuel and an oxidizer. Unlike a battery, the cells and its electrodes are unchanged. The fuel hydrogen is pumped through the negative electrode into a solution, electrolyte, where it reacts with charged particles ions to produce water. At the positive electrode, oxygen renews the ions so that there is a net flow between the electrodes, creating a potential difference, a voltage in a circuit connecting the electrodes.

Figure 33:
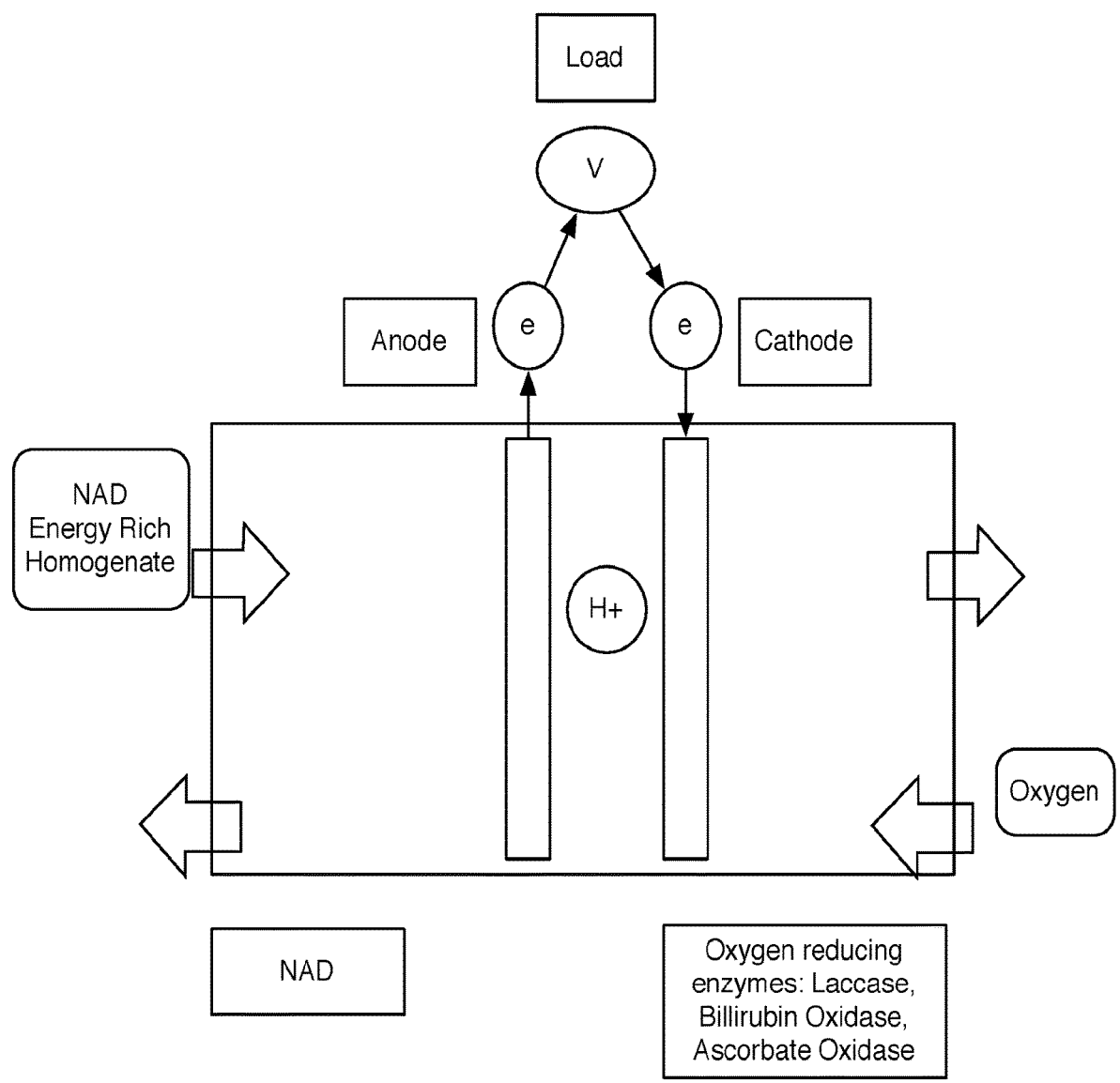
FIG. 33 illustrates an example modified enzymatic biofuel cell
Figure 35:
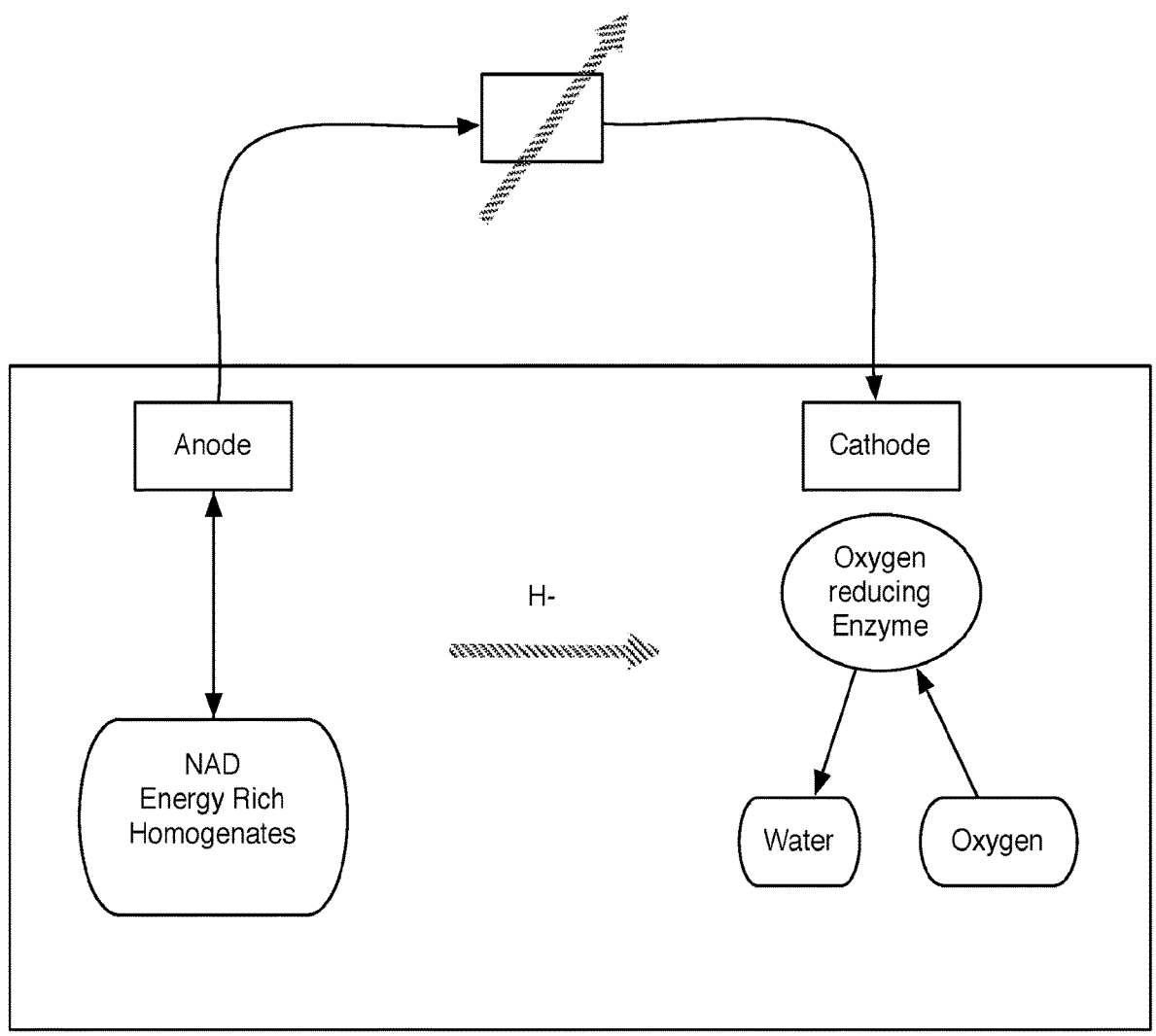
FIG. 35 illustrates an example modified enzymatic biofuel cell.
Figure 36:
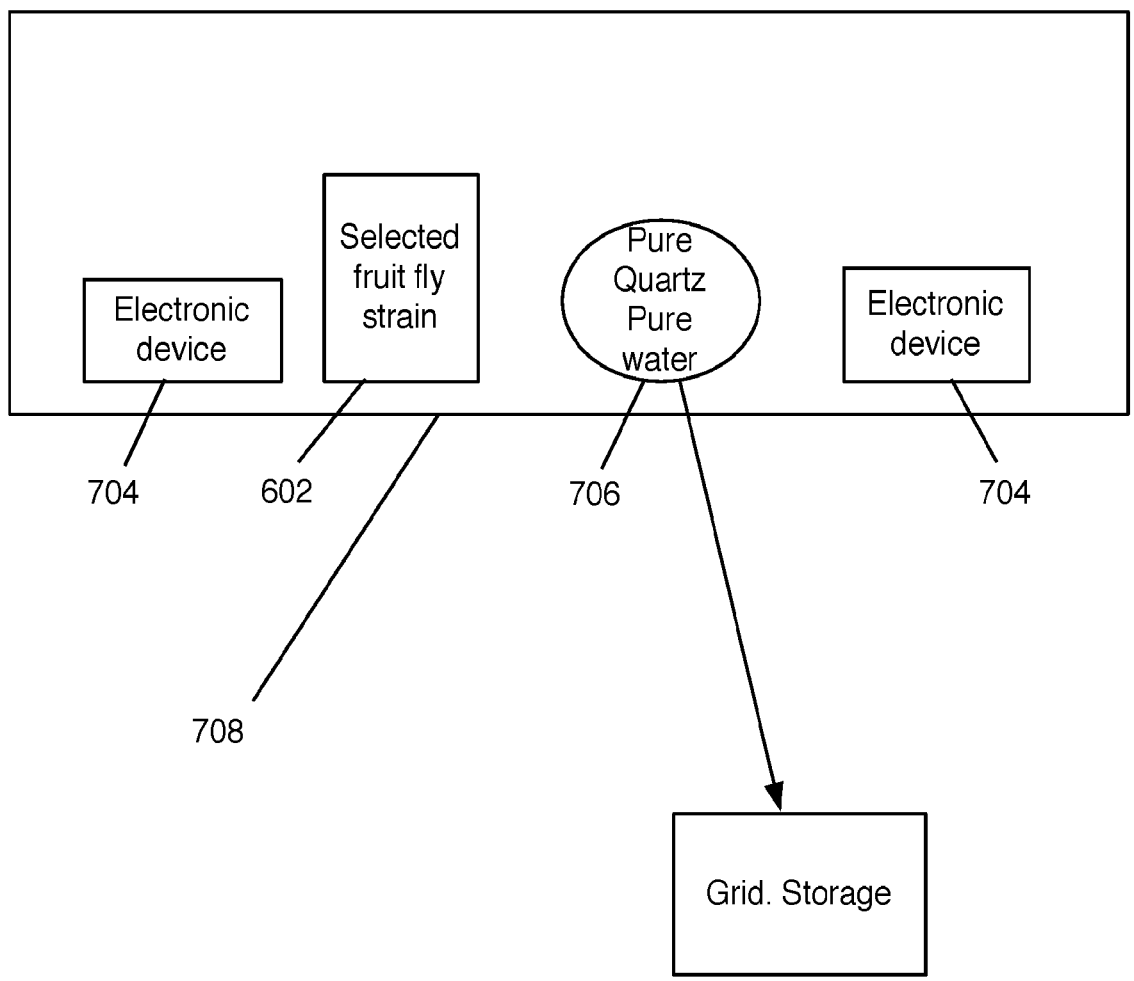
FIG. 36 illustrates one embodiment of a stand-alone, whole organism energy system.

In a preferred embodiment of the disclosed system, illustrated in FIGS. 33 and 35, the type of fuel cell used is a modified enzymatic biofuel cell. The anode of the enzymatic biofuel cell can be catalyzed by oxidases suitable for conversion of bio-fuels or can be catalyzed by a complex of such enzymes for a complete oxidation of bio-fuels. For example, as illustrated in FIGS. 32 and 34, the bio-fuel to be oxidized can be glucose, and the catalysts can include the fuel oxidizing enzymes glucose oxidase, glucose dehydrogenase and alcohol dehydrogenase. The cathode of the enzymatic biofuel cell can include an oxidoreductase that uses molecular oxygen as the ultimate electron acceptor and catalyzes reduction to water in neutral or slightly acidic media.

In the context of the modified enzymatic fuel cell, embodiments of which are illustrated in FIGS. 33 and 35, the disclosed system includes a selection process for fruit flies with increased energy availability and extraction procedures yielding energy rich homogenates, as described above. In one embodiment, the energy rich homogenates can act as the bio-fuel and NAD can be used as a catalyst to replace currently used enzymes. Alternatively, instead of fully replacing current fuels and enzymes, the energy rich homogenates can supplement the fuel and NAD can supplement the enzymes. A third option includes the use of oxygen as the substrate, NAD as the catalyst, and the energy rich homogenates as the source of electrons. The anode and electrode can further be separated by the PEM.

Solar Panels

The energy rich homogenate can also be used directly in a solar panel as a novel reactive matrix. For example, in one embodiment, the disclosed system can couple to a solar voltaic cell. Standard solar voltaic cells include two silicon semiconductors between metal contacts, protected by a grid. One semiconductor may tend to collect positive charge, while the other semiconductor may tend to collect negative charge. As light photons hit the junction between the semiconductors, which is a p-type silicon crystal coated with an n-type silicon crystal, they can displace electrons that are attracted to the positive semiconductor. Metal contacts can connect the two charged areas, exploiting the potential difference and creating a current. Absorption of photons by atoms and molecules can cause excitation or ionization.

A solar voltaic cell can be integrated with the disclosed system by coupling the energy rich homogenate to the junction between the semiconductors. When, as described above, NAD is added to the energy rich homogenate, the NAD pool in the energy rich homogenate becomes relatively oxidized. Therefore, electron transport is enhanced from the oxidized NAD pool. Electron transport is also enhanced from the energy rich homogenate because of its metabolic stasis and absent or limited glycolytic and citric acid cycle activity. The enhanced electron transfer modifies the redox potential of the solar voltaic cell causing accelerated electron transport between the two silicon semiconductors.

Linear Accelerators

The energy rich homogenate can also be used directly with components of a linear accelerator that collect the particles that are generated. Linear accelerators are, essentially, large electromagnets. Generally, particles are collided with each other in the linear accelerator to yield smaller particles, which are detected by components of the linear accelerator. Electrons and protons are considered larger particles than those traditionally under study in the linear accelerator. Therefore, when the energy rich homogenates are combined with the linear accelerator components, electrons and protons may be readily transferred from the energy rich homogenates to storage devices or the grid. In sum, this process can extract electrons and protons from the energy rich homogenates by reversing the direction of flow through the system as it is normally used.

Stand-Alone, Whole Organism Energy System

Figure 6:
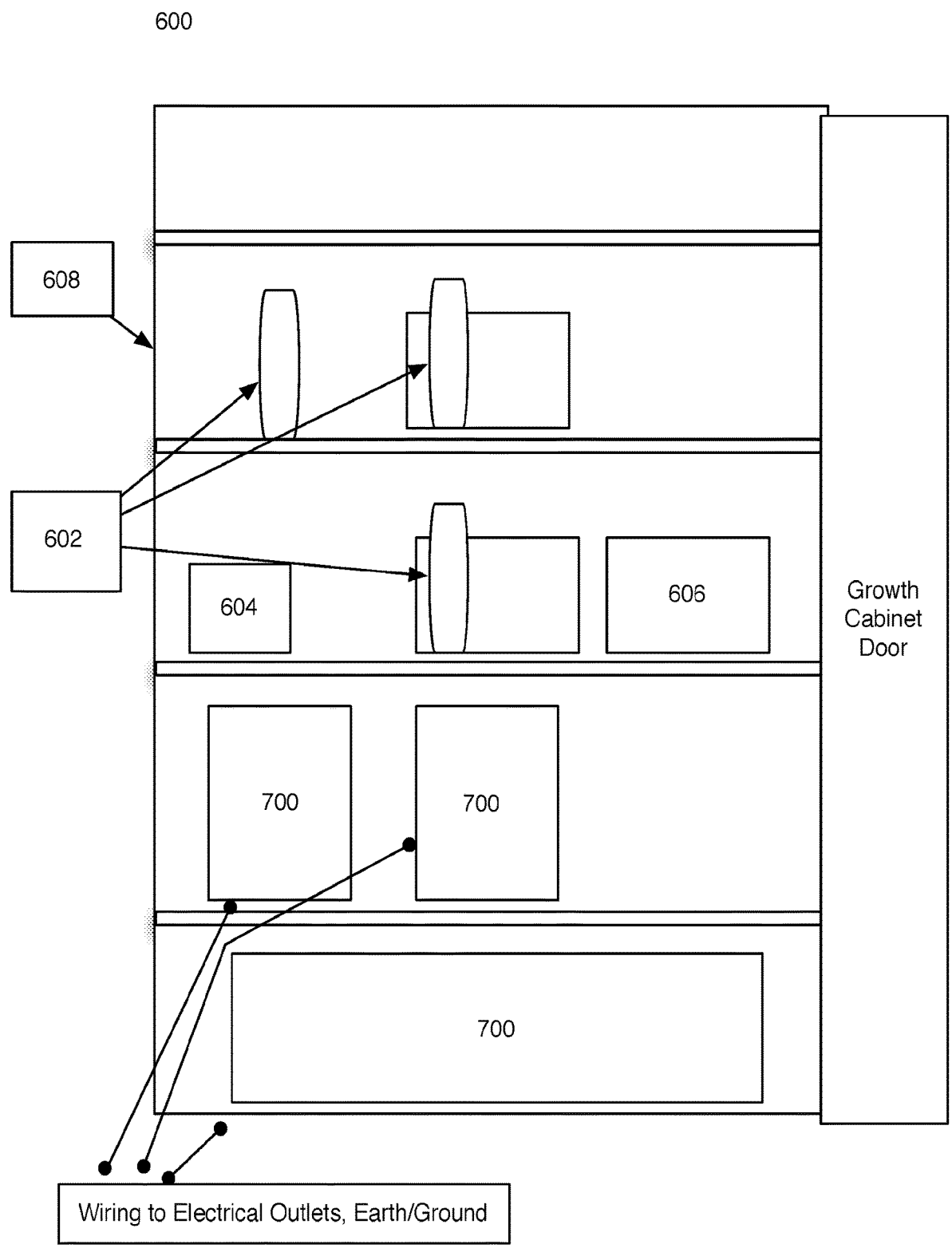
FIG. 6 illustrates one embodiment of a stand-alone, whole organism energy system.

As described above and illustrated in FIGS. 6-12 and 36, the stand-alone, whole organism energy system 600 is one of the five different ways to obtain energy from the desired, energy enhanced fruit fly strains, with the other four ways all using an energy rich homogenate created from the fruit flies. This system 600 includes a refrigerated growth cabinet 608, a device with electromagnetic field (EMF) shielding 700, specific EMFs, a light source 604, a solid-state quartz system 706 that acts as a chip, purified water 606, and at least one energy enhanced fruit fly colony 602, as illustrated in FIG. 6. It is a stand-alone source of bio-energy. However, based on the use of the quartz system 706, this device may be integrated with a solar panel.

Figure 7:
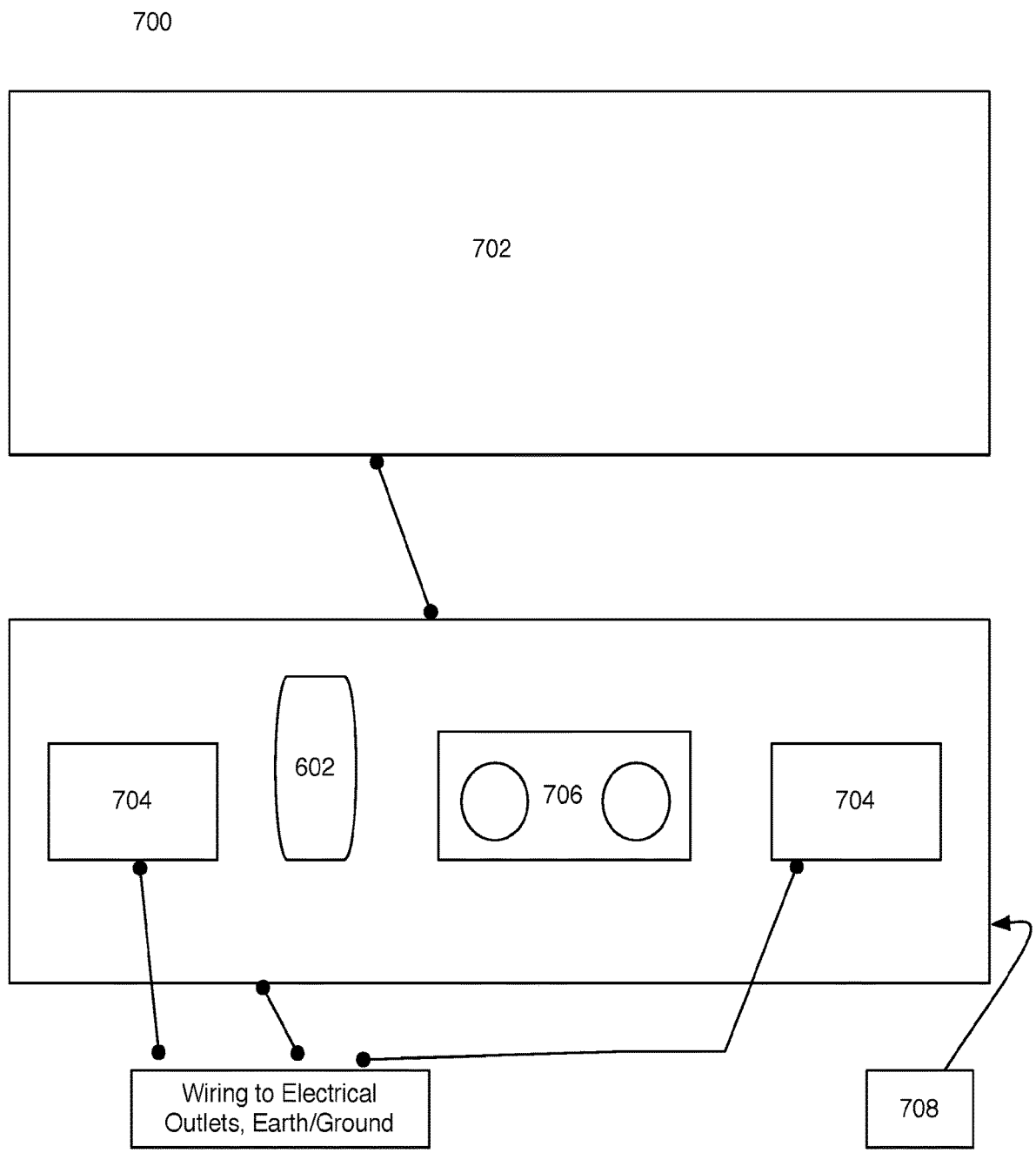
FIG. 7 illustrates a top down view of one embodiment of a stand-alone, whole organism energy system.
Figure 8:
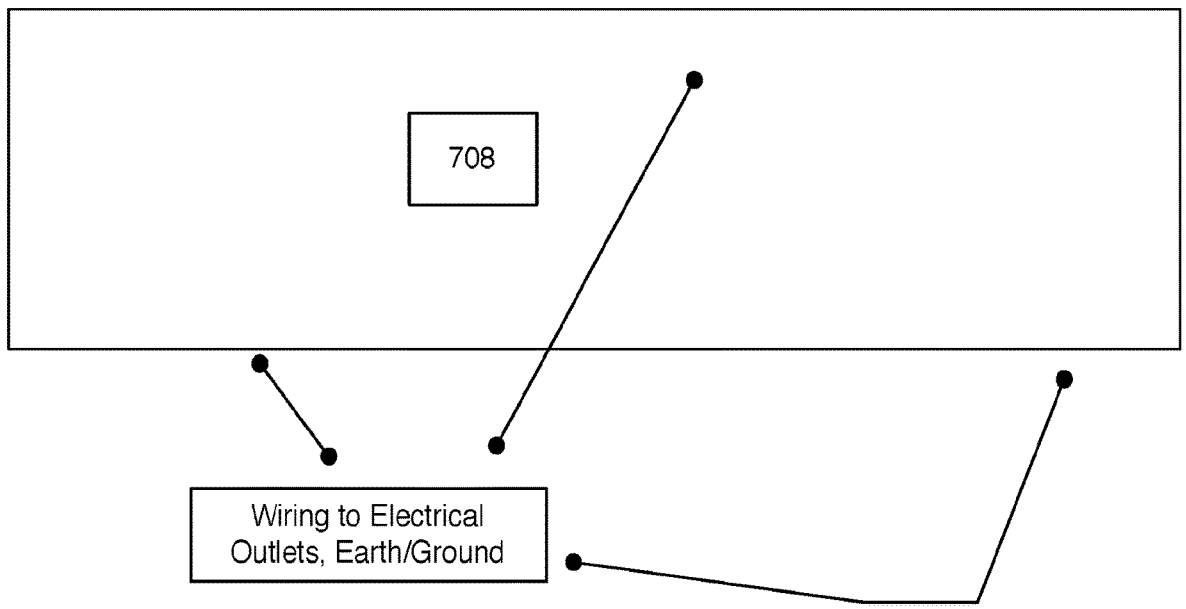
FIG. 8 illustrates a side view of one embodiment of a stand-alone, whole organism energy system
Figure 9:
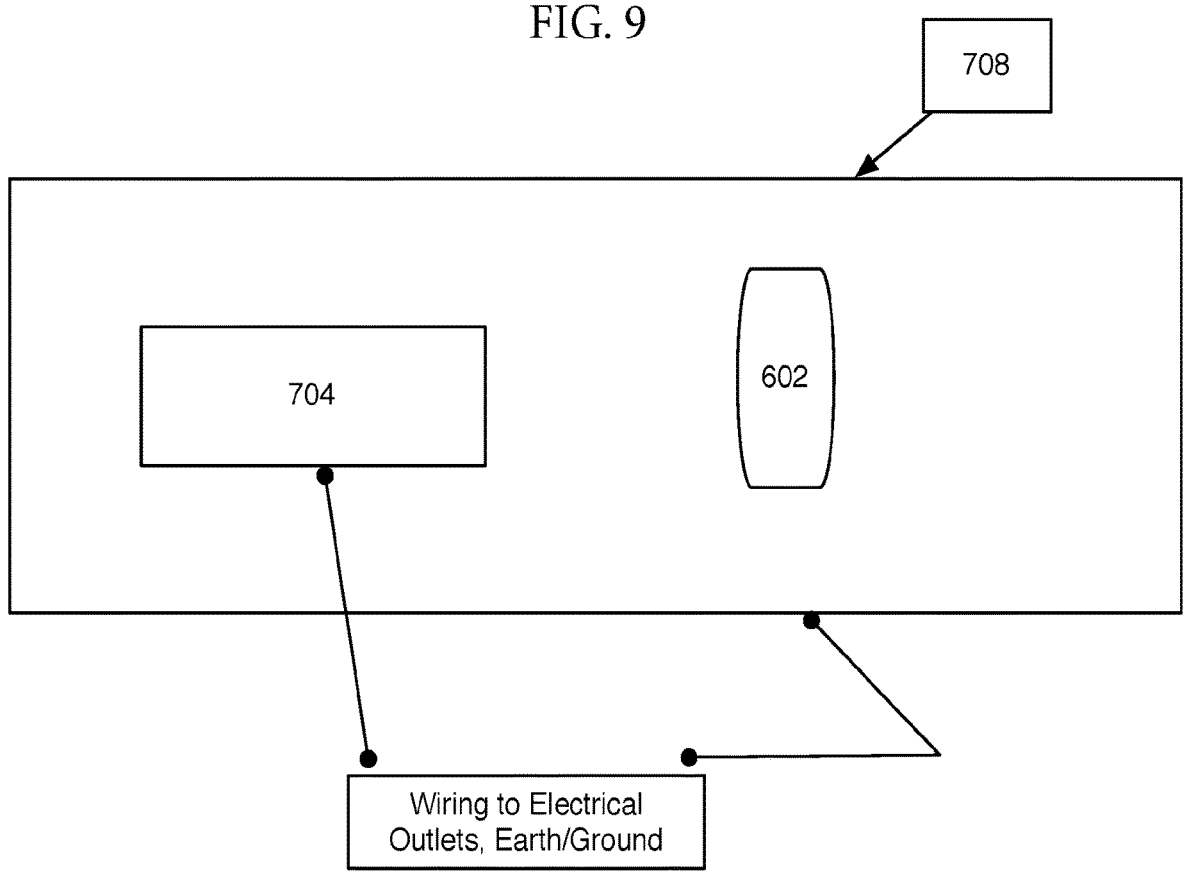
FIG. 9 illustrates a top down view of one portion of one embodiment of a stand-alone, whole organism energy system.
Figure 10:
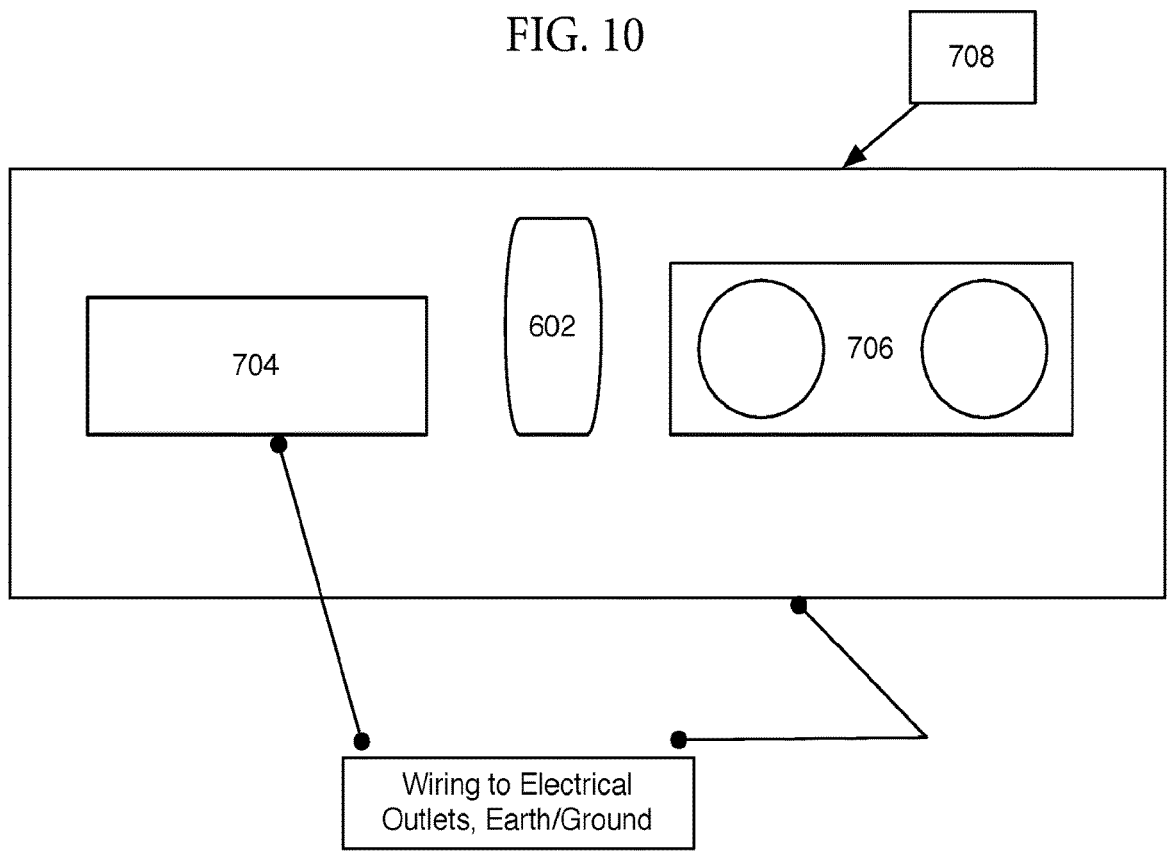
FIG. 10 illustrates a top down view of one portion of one embodiment of a stand-alone, whole organism energy system.
Figure 11:
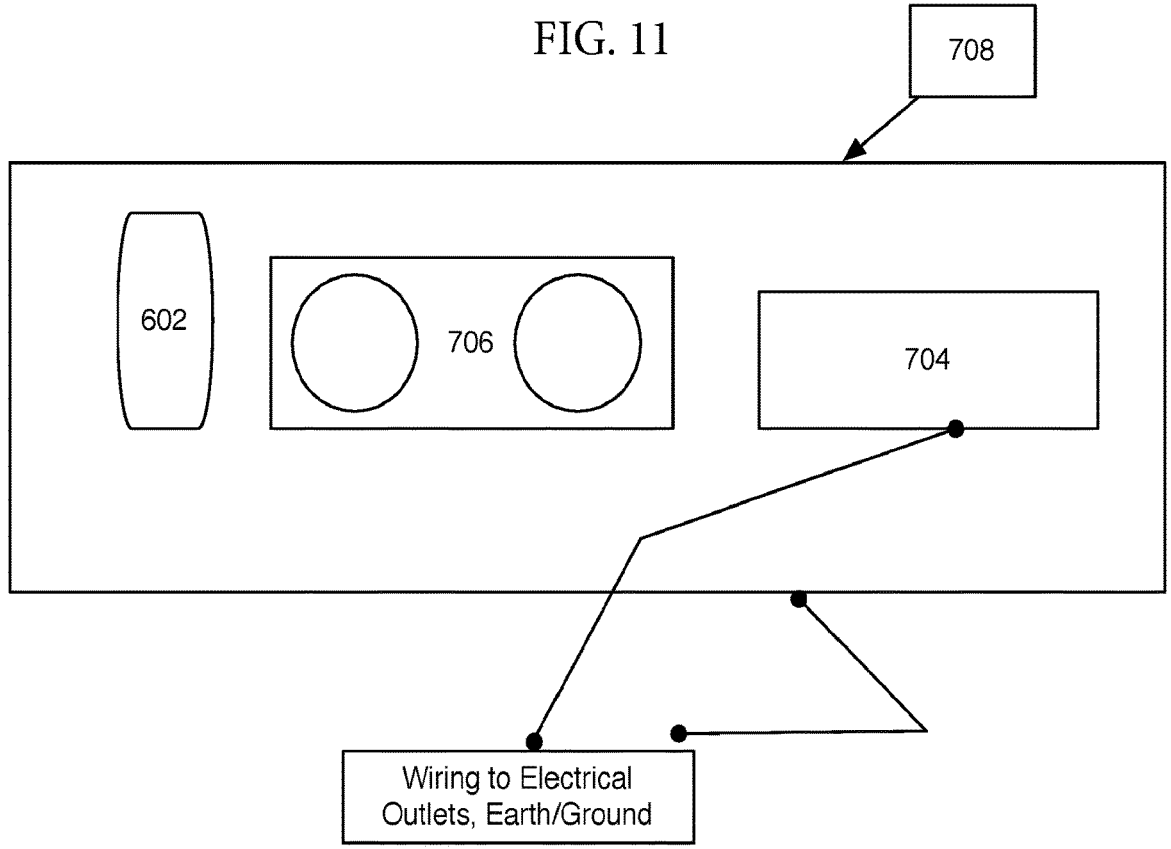
FIG. 11 illustrates a top down view of one portion of one embodiment of a stand-alone, whole organism energy system.
Figure 12:
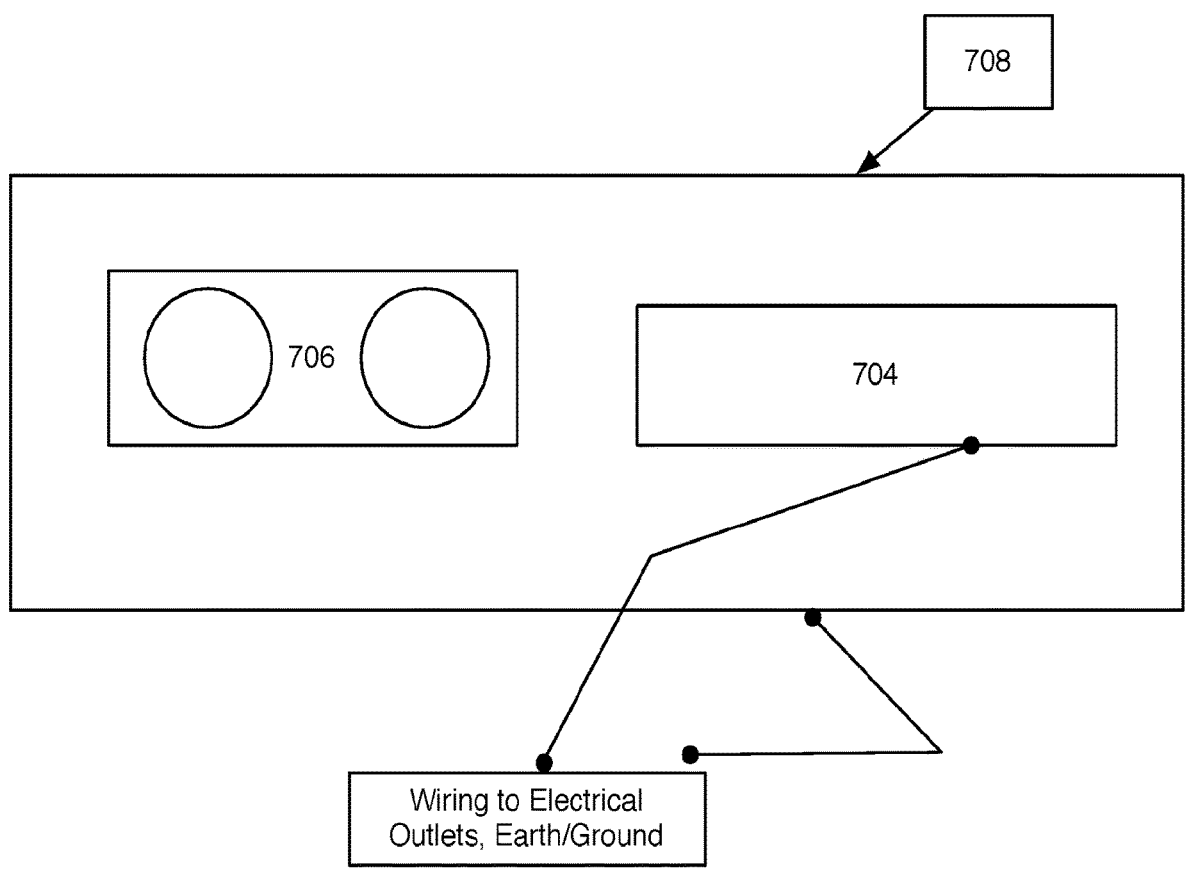
FIG. 12 illustrates a top down view of one portion of one embodiment of a stand-alone, whole organism energy system.
Figure 13:
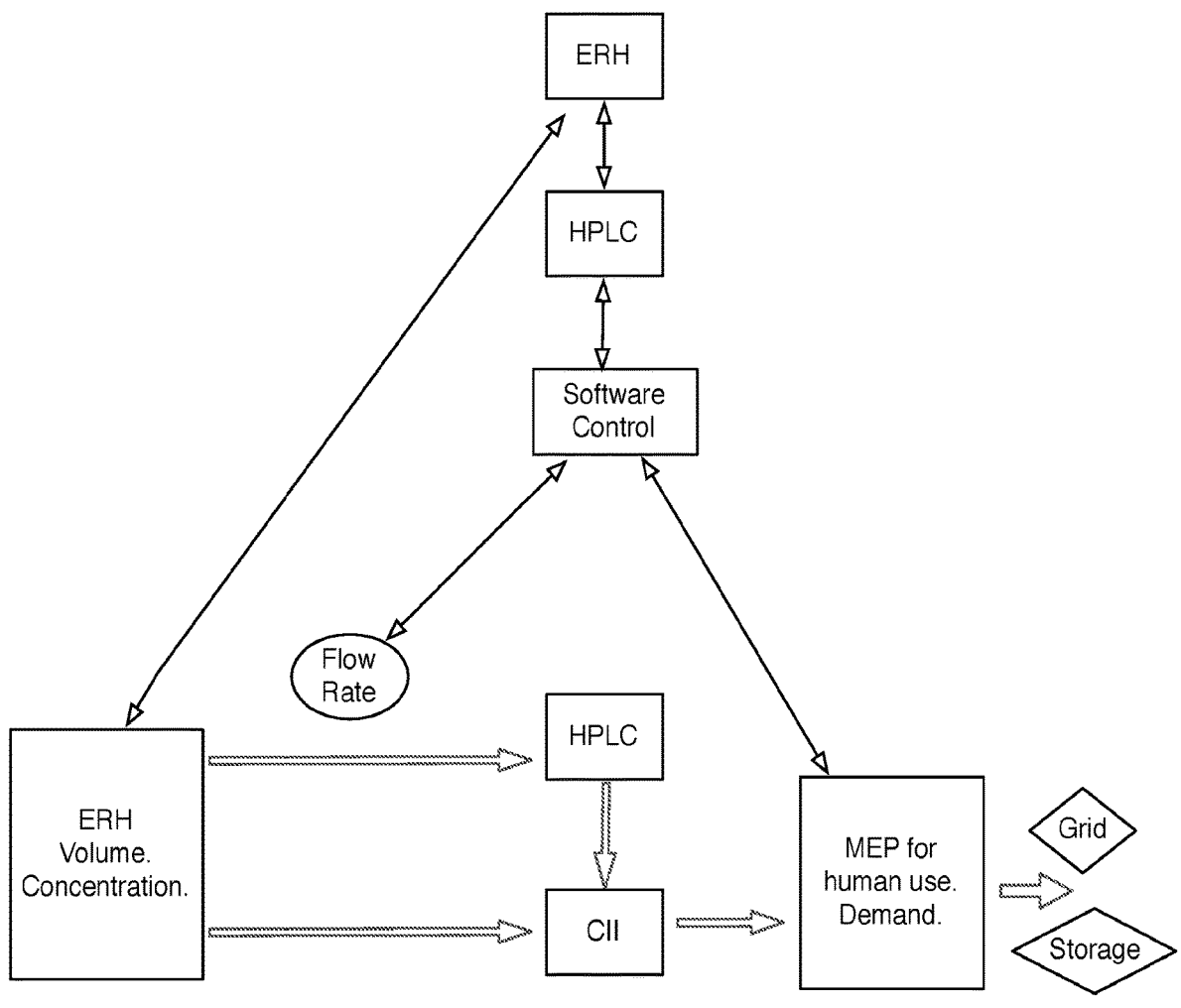
FIG. 13 is a diagram depicting the interaction between various components of one embodiment of the current disclosed.
Figure 14:
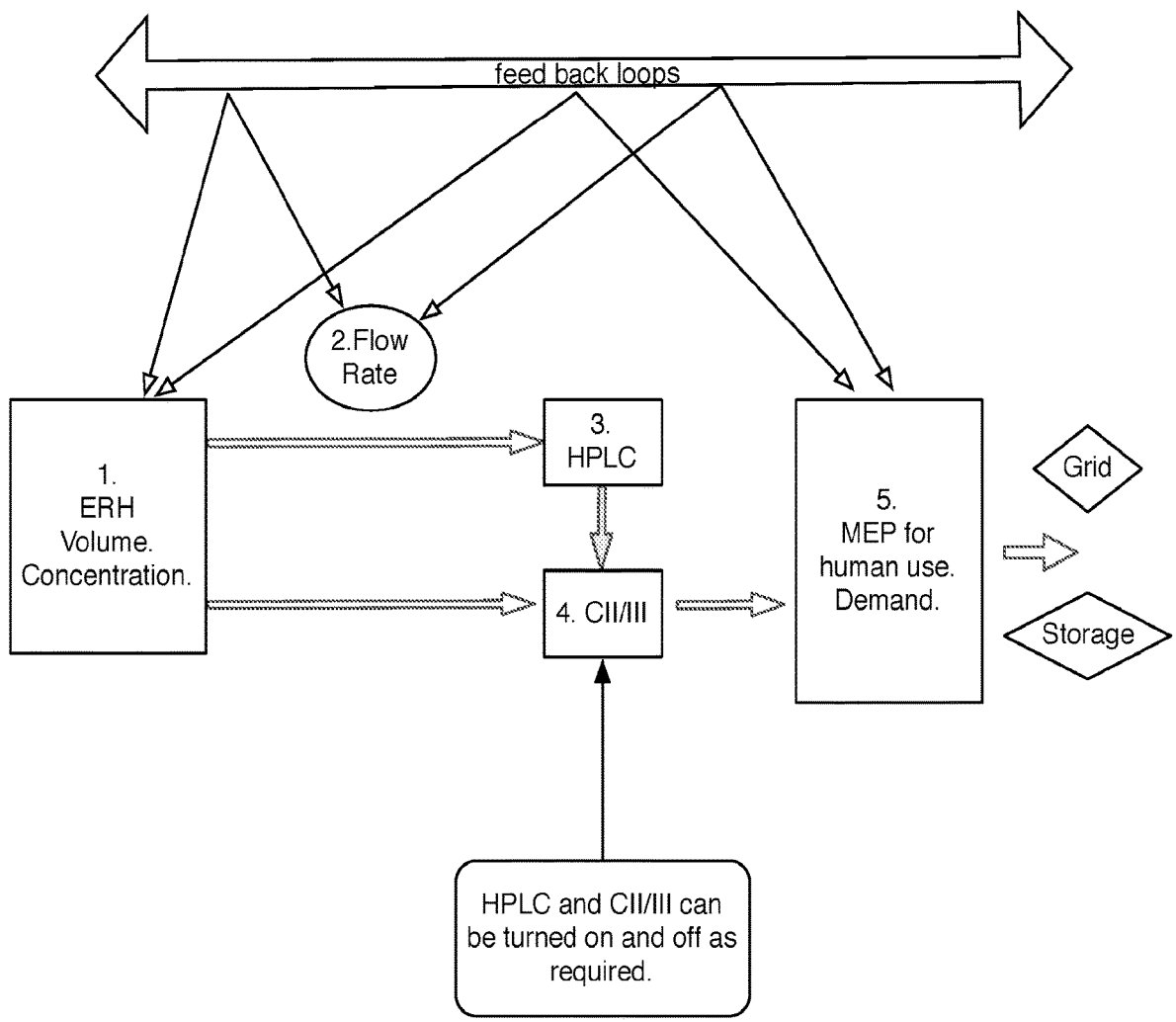
FIG. 14 is a diagram depicting feedback loops that exist in one embodiment of the current disclosure.
Figure 15:
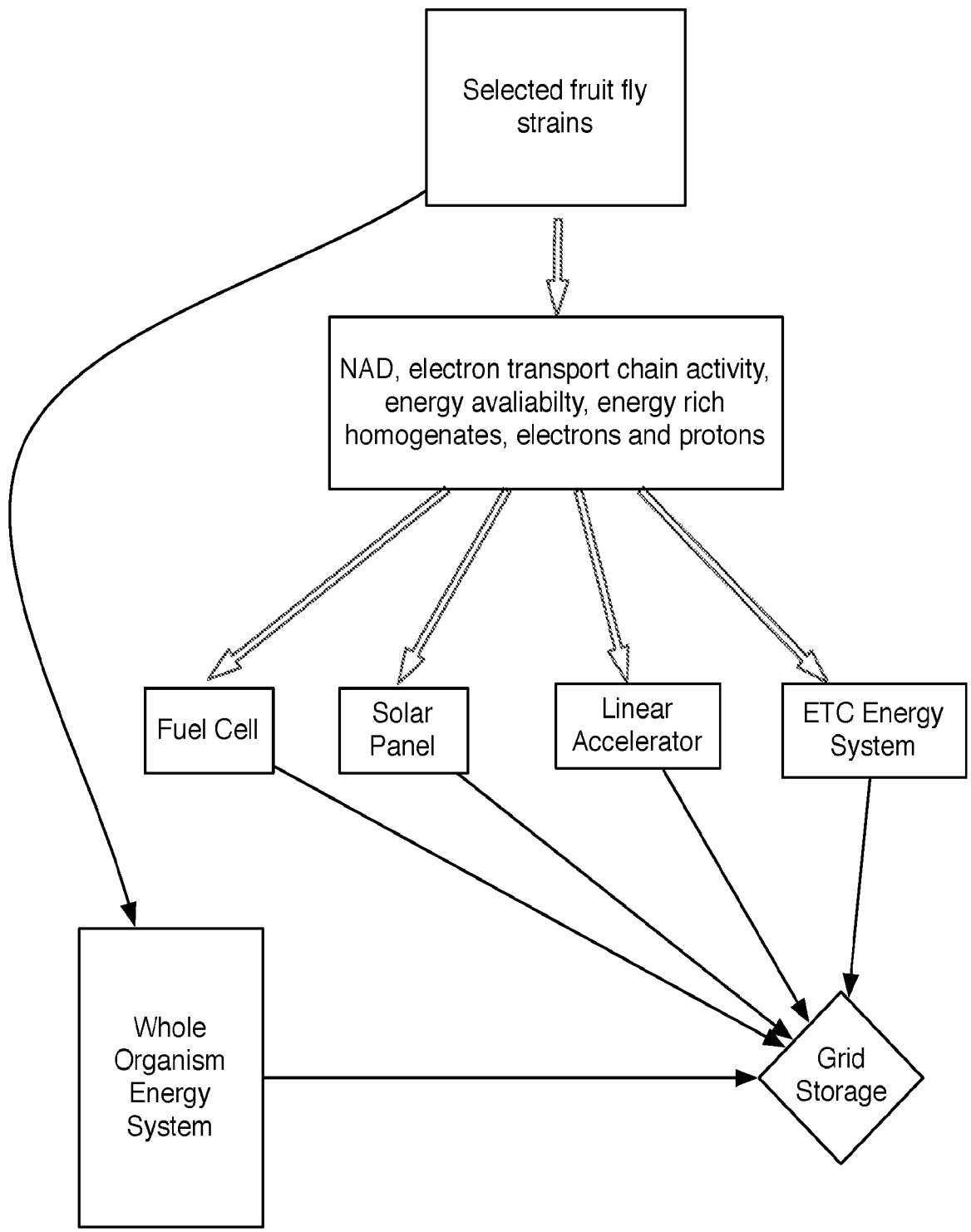
FIG. 15 is a diagram depicting how energy extracts from an organism can be coupled to various technologies for human use after selection for enhanced energy availability in the organism has taken place.
Figure 16:
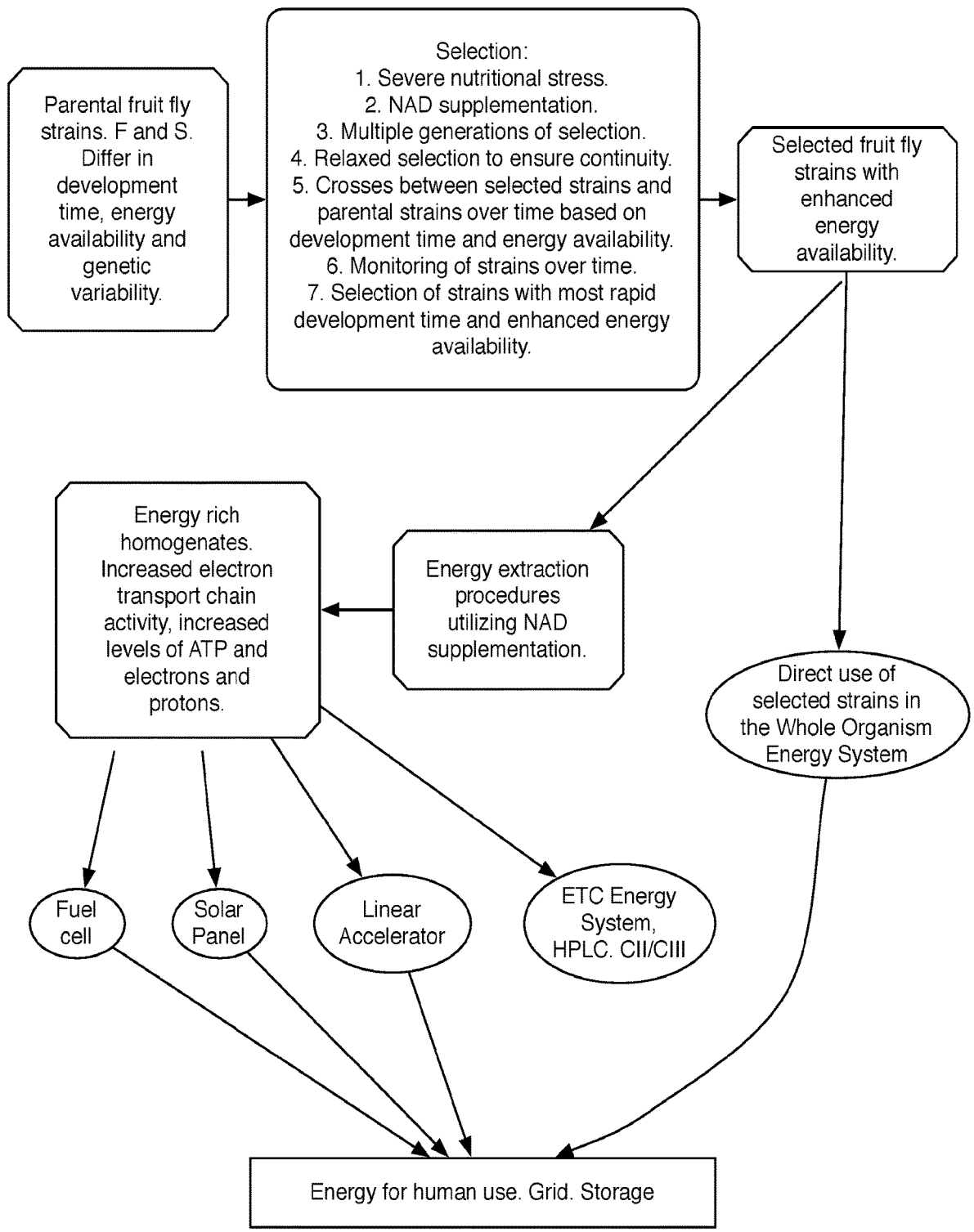
FIG. 16 is a diagram depicting an overall selection process for enhanced energy availability in an organism and further depicting the various ways the selected organisms can be processed for human use.

The device with EMF shielding 700 includes a standard Faraday cage 708 and Faraday cage lid 702 with a copper mesh screen enclosing an interior space, as illustrated in FIG. 7. The Faraday cage 708 and lid 702 can be grounded so the electromagnetic waves of wavelengths larger than the mesh size will leak off to the ground and only minimally penetrate the interior space. Therefore, the interior space can have a greatly reduced electromagnetic integrated power density in the wavelengths larger than the copper mesh spacing. A copper mesh cage with dimensions of 40 cm by 40 cm by 30 cm can reduce the EMF strength by a factor between 10 and 50.

Electronic devices 704 can be located in the interior space. One electronic device 704 can be a triple oscillator devise producing frequencies of, for example, 5.0, 8.0, and 9.3 MHz. The output power of the electronic devices 704 at the exposure distance can be less than 1 microwatt. The electronic device 704 can be an electronic device that has not been exposed to human informational influences or it can be an electronic device that has been exposed to human informational influences. Inclusion of both types of electronic devices 704 in the interior space can increase the ATP/ADP ratio and decrease development time in the fruit fly strains.

Therefore, the interior space of the Faraday cage 708 can hold an electronic device 704 not exposed to human informational influences, a selected fruit fly colony 602 in a bottle culture, pure quartz test tubes containing pure water 706, and an electronic device 704 exposed to human information influences, as illustrated in FIGS. 7 and 9-12. The standard Faraday cage, which includes the copper mesh screen enclosing the interior space with other components, can be grounded and located in a growth cabinet at a defined temperature, such as 18 degrees Celsius. The shielding and specific EMFs of this system facilitate transfer of bio-energy from the energy enhanced fruit fly strains to the pure quartz-water system.

Storage Device

The bio-energy (ex: NAD, ATP, ADP, and AMP) and the electrical energy (electrons and protons) from the energy enhanced fruit fly strains are stored primarily in those selected fruit fly strains, similar to how energy from fossil fuels is stored in fossil fuels. The bio-energy and the electrical energy from the energy enhanced fruit fly strains can be released during the extraction and transfer process.

As described above, there are five ways to directly and immediately use the energy stored in the fruit flies. Four of the five ways involve extracting bio-energy, electrons and protons from any of the four types of energy rich homogenates via a fuel cell, solar panel, linear accelerator, or ETC energy system, illustrated in FIGS. 24-25 and 27, and immediately using that electrical energy. The fifth way involves extracting electrons and protons via the stand-alone, whole organism energy system 600 for immediate use.

However, instead of extracting the electrical energy from the fruit flies and immediately using the energy, the energy can be stored in, for example, capacitors, additional fuel cells, power plants, solar panels, or other systems.

In one example of fuel cell technology to be used as energy storage, the energy is derived from the fruit flies, as described above, and stored in the form of hydrogen. For example, excess electrical energy from the fruit flies can be fed into an electrolyser to split water into its constituent parts, oxygen and hydrogen. The hydrogen can then be stored in any type of fuel cell, which operates as the most efficient means of converting hydrogen back to electricity. Further, electrolysers and fuel cells are complementary technologies. Therefore, when energy is needed, the fuel cell can release the stored energy back to the grid. Alternatively, instead of releasing energy to the grid, the stored hydrogen can be diverted for sale to fuel cell electric vehicle owners, who use proton exchange membrane fuel cells to power their vehicles.

In one example of energy storage, the energy is derived from the fruit flies, as described above, converted to hydrogen, and stored in quinone-based flow batteries. In another example, the energy derived from the fruit flies can be converted into heat and the heat can be captured in thermal storage banks. One example of a thermal storage bank is where the converted thermal energy from the fruit flies is stored in molten salt, which can absorb extremely high temperatures without changing state.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A bio-energy power system comprising:
   carrying out a multiple generation selection process by alternating stressful food conditions that include agar, yeast, water, and nicotinamide adenine dinucleotide with non-stressful food conditions for each generation, wherein the multiple generation selection process comprises:

(a) culturing a parent generation of a Drosophila melanogaster strain on the stressful food condition;
(b) removing the parent generation after the parent generation lays eggs on the stressful food;
(c) allowing the eggs on the stressful food to hatch, wherein the newly hatched offspring create a first generation of offspring;
(d) collecting the first generation offspring from the stressful food and relocating the first generation offspring to a non-stressful food condition of at least instant dry food and water;
(e) removing the first generation offspring from the non-stressful food after the first generation offspring lay eggs on the non-stressful food;
(f) placing the first generation offspring on the stressful food;
(g) removing the first generation offspring from the stressful food after the first generation offspring lay eggs on the stressful food;
(h) allowing the first generation offspring eggs on the stressful food to hatch, wherein the newly hatched offspring created from the first generation offspring are a second generation of offspring;
(i) repeating (d) through (h) for the second generation offspring and each offspring generation thereafter to create a predetermined number of generations, such that each offspring generation becomes a next parent generation that creates a following generation of offspring, wherein a last generation of offspring from the predetermined number of generations is a Drosophila melanogaster strain having a greater amount of ATP availability compared to earlier generations derived from the parent generation;
extracting an energy rich homogenate from the last offspring Drosophila melanogaster strain, which is an enhanced energy Drosophila melanogaster strain; and
transferring the energy rich homogenate to a device.

2. The system of claim 1, wherein the device is a fuel cell, a solar panel, a linear accelerator, a storage device, or an electron transport chain energy system.

3. The system of claim 1, wherein the predetermined number of generations is ten, such that newly hatched offspring created from a ninth generation offspring are a tenth generation of offspring, and wherein the tenth generation offspring are a first enhanced energy Drosophila melanogaster strain.

4. The system of claim 3, wherein:
the multiple generation selection process further comprises applying the selection process (a) through (i) to a parent generation of a second Drosophila melanogaster strain and a plurality of offspring generations from the second Drosophila melanogaster strain parent generation,
the predetermined number of generations is six, such that newly hatched offspring created from a fifth generation offspring are a sixth generation of offspring, and from the sixth generation offspring are a second enhanced energy Drosophila melanogaster strain having a greater amount of ATP availability compared to earlier generations derived from the second Drosophila melanogaster strain parent generation.

5. The system of claim 4, wherein the multiple generation selection process further comprises:
placing the first and second enhanced energy Drosophila melanogaster strains on the non-stressful food;
removing the first and second enhanced energy Drosophila melanogaster strains from the non-stressful food after the first and second enhanced energy Drosophila melanogaster strains lay eggs on the non-stressful food;
allowing the eggs on the non-stressful food to hatch, wherein the newly hatched offspring created from the first and second enhanced energy Drosophila melanogaster strains are a third enhanced energy Drosophila melanogaster strain having a greater amount of ATP availability compared to the first and second enhanced energy Drosophila melanogaster strains.

6. The system of claim 1, wherein extracting the energy rich homogenate from the last offspring Drosophila melanogaster strain further comprises:
homogenizing larvae from the enhanced energy Drosophila melanogaster strain in pure water, wherein the larvae are transferred to at least one centrifuge tube before or after homogenization; and
storing the at least one centrifuge tube on ice for a predetermined amount of time to facilitate metabolic activity, wherein after the predetermined amount of time, the homogenized larvae are the energy rich homogenate.

7. The system of claim 6, wherein a supplement is added to the energy rich homogenate.

8. The system of claim 7, wherein the supplement is at least one of nicotinamide adenine dinucleotide or pure water.

9. The system of claim of 1, wherein at least one of nicotinamide adenine dinucleotide, adenosine triphosphate, adenosine diphosphate, or adenosine monophosphate is extracted from the energy rich homogenate using formic acid and ammonium hydroxide prior to transferring the energy rich homogenate to the device.

10. A method of creating, extracting, and transferring energy, the method comprising:
utilizing a multiple generation selection process by alternating stressful food conditions that include agar, yeast, water, and nicotinamide adenine dinucleotide with non-stressful food conditions for each generation, wherein each offspring generation becomes a next parent generation that creates a following generation of offspring to produce a Drosophila melanogaster strain having a greater amount of ATP availability compared to earlier generations derived from a parent generation, the multiple generation selection process including the steps of:
(a) culturing the first parent generation of a first Drosophila melanogaster strain on the stressful food condition;
(b) removing the parent generation after the parent generation lays eggs on the stressful food;
(c) allowing the eggs on the stressful food to hatch, wherein the newly hatched offspring create a first generation of offspring;
(d) collecting the first generation offspring from the stressful food and relocating the first generation offspring to a non-stressful food condition of at least instant dry food and water;
(e) removing the first generation offspring from the non-stressful food after the first generation offspring lay eggs on the non-stressful food;
(f) placing the first generation offspring on the stressful food;
(g) removing the first generation offspring from the stressful food after the first generation offspring lay eggs on the stressful food;
(h) allowing the first generation offspring eggs on the stressful food to hatch, wherein the newly hatched offspring created from the first generation offspring are a second generation of offspring;

(i) repeating (d) through (h) for the second generation offspring, wherein the newly hatched offspring in (h) created from the second generation offspring are a third generation of offspring;

(j) repeating (d) through (h) for the third generation offspring created in (i), wherein the newly hatched offspring in (h) created from the third generation offspring are a fourth generation of offspring;

(k) repeating (d) through (h) for the fourth generation offspring created in (j), wherein the newly hatched offspring in (h) created from the fourth generation offspring are a fifth generation of offspring;

(l) repeating (d) through (h) for the fifth generation offspring created in (k), wherein the newly hatched offspring in (h) created from the fifth generation offspring are a sixth generation of offspring;

(m) repeating (d) through (h) for the sixth generation offspring created in (l), wherein the newly hatched offspring in (h) created from the sixth generation offspring are a seventh generation of offspring;

(n) repeating (d) through (h) for the seventh generation offspring created in (m), wherein the newly hatched offspring in (h) created from the seventh generation offspring are an eighth generation of offspring;

(o) repeating (d) through (h) for the eighth generation offspring created in (n), wherein the newly hatched offspring in (h) created from the eighth generation offspring are a ninth generation of offspring; and (p) repeating (d) through (h) for the ninth generation offspring created in (o), wherein the newly hatched offspring in (h) created from the ninth generation offspring are a tenth generation of offspring;

extracting an energy rich homogenate from the tenth generation offspring Drosophila melanogaster strain by:

gathering larvae of a single culture of the tenth generation offspring Drosophila melanogaster strain;

homogenizing the larvae in pure water, wherein the larvae are transferred to at least one centrifuge tube before or after homogenization;

storing the at least one centrifuge tube on ice for a predetermined amount of time to facilitate metabolic activity, wherein after the predetermined amount of time, the homogenized larvae are an energy rich homogenate; and adding a supplement to the energy rich homogenate.

* * * * *